(12) United States Patent
Tanaka et al.

(10) Patent No.: US 6,939,232 B2
(45) Date of Patent: Sep. 6, 2005

(54) INFORMATION PROCESSING SYSTEM COMPRISING A PLURALITY OF OPERATION TERMINAL DEVICES AND AN INFORMATION PROCESSING DEVICE

(75) Inventors: Makoto Tanaka, Tokyo (JP); Toru Akazawa, Tokyo (JP); Rajesh Kumar Dixit, Tokyo (JP)

(73) Assignee: Sony Computer Entertainment Inc. (JP)

( * ) Notice: Subject to any disclaimer, the term of this patent is extended or adjusted under 35 U.S.C. 154(b) by 224 days.

(21) Appl. No.: 09/938,446

(22) Filed: Aug. 24, 2001

(65) Prior Publication Data

US 2002/0072410 A1 Jun. 13, 2002

(30) Foreign Application Priority Data

Oct. 27, 2000 (JP) ........................................ 2000-329595

(51) Int. Cl.[7] ................................................. A63F 9/22
(52) U.S. Cl. ......................................................... 463/37
(58) Field of Search .................................. 463/6, 36–43

(56) References Cited

U.S. PATENT DOCUMENTS 4,739,128 A 4/1988 Grisham
6,247,994 B1 * 6/2001 DeAngelis et al. .......... 446/454
6,322,451 B1 * 11/2001 Miura ........................... 463/42
6,422,943 B2 * 7/2002 Shinohara et al. ............ 463/37

FOREIGN PATENT DOCUMENTS

| JP | 01-196648 A1 | 8/1989 |
| JP | 02-27236 U | 2/1990 |
| JP | 5-86388 U | 11/1993 |
| JP | 06-142338 A | 5/1994 |
| JP | P2000-157719 A | 6/2000 |
| JP | 2001-147758 A | 5/2001 |

* cited by examiner

Primary Examiner—Michael O'Neill
Assistant Examiner—Corbett Coburn
(74) Attorney, Agent, or Firm—Lerner, David, Littenberg, Krumholz & Mentlik, LLP

(57) ABSTRACT

In the disclosed invention, correlation information expressing the correlation between a plurality of operation terminal devices and information operable therethrough is generated, and such correlation information is output to the operation terminal devices. Such present invention allows the operators of the operation terminal devices to readily recognize the correlation between the operation terminal devices and information operable therethrough among information handled on an information processing devices.

31 Claims, 15 Drawing Sheets

INFORMATION PROCESSING SYSTEM COMPRISING A PLURALITY OF OPERATION TERMINAL DEVICES AND AN INFORMATION PROCESSING DEVICE

CROSS REFERENCE TO RELATED APPLICATION

The subject application is related to Japanese Patent Application No. 2000-329595 filed on Oct. 27, 2000 in Japan, based on which this application claims priority under the Paris Convention and the contents of which are incorporated herein by reference.

BACKGROUND OF THE INVENTION

The present invention relates to an information processing system such as a video game machine and a method for such processing, more specifically to an operation terminal device such as a video game machine controller or an information transmission device for transmitting information therebetween and a method for such transmission, and still more specifically to an information processing system comprising a plurality of operation terminal devices and an information processing device such as an entertainment system comprising a video game machine and a plurality of controllers, a processing program for executing such operations and a recording medium storing such processing program.

There is known a video game machine having controller ports capable of connecting a plurality of controllers, to thereby allow a plurality of players to enjoy the same game through individually controlling such controllers.

For a game enjoyed by a plurality of players through such individual operations of the controllers, it is necessary that the correlation between the individual game characters appear on a television monitor and the individual controllers for operating such game characters can be recognized by the players by themselves.

The game will never proceed smoothly if the players cannot recognize by themselves that which game character is controlled by which controller, so that it is particularly important for such game that the correlation between the game characters and the controllers can be recognized by the players.

It is to be noted now that the matters controlled by the controller are not limited to the game characters, and that the matters which should clearly be correlated with the controllers are again not limited to the game characters, while the above description exemplifies those for simplicity.

In a conventional video game machine, controller ports are provided to the main unit of the game machine and controllers operated by a player are connected via cables in one-to-one manner, so that each player recognizes the correlation between a game character and a controller responsible for the operation thereof by tracing the cable and confirming a position (a port number assigned to each port, for example) of a controller port to which the controller under handling by the player is connected. For example, for the case that game character "a" is operable via a first controller port by a controller, and that game character "b" is operable via a second controller port by another controller, each player can know its own controllable game character by tracing the cable and confirming a port number to which the controller is connected.

Some of conventional applications for the video game machine (game application program or device driver program) are known to allow the controllers in a number larger than that of the controller port by using a port duplicator (multi-tap).

Such method for recognizing which controller is connected to which controller port by tracing the cable is, however, disadvantageous in that such cable tracing is labor-consuming, which makes it difficult to confirm the correlation between the controller ports and the individual controllers connected thereto in particular for the case that the video game machine and the controllers are rather distant from each other while being connected with long cables, or for the case that a large number of controllers are connected to the video game machine via tangled cables. This means that confirming the correlation between the controller operated by the player and the game character becomes difficult or labor-consuming.

SUMMARY OF THE INVENTION

It is therefore an object of the present invention to provide an information processing device and a processing method, an operation terminal device, an information transmission device and a transmission method, an information processing system, a processing program for executing such operations, and a recording medium storing such processing program, all of which allow the operator to readily recognize the correlation between the individual operation terminal devices and information operable therethrough in an information processing system comprising a plurality of operation terminal devices, an information processing device capable of connecting such plurality of operation terminal devices, and an information transmission device for effecting information transmission between such devices, such system being typified by an entertainment system comprising a plurality of controllers and a video game machine having controller ports capable of connecting such controllers.

According to the present invention, correlation information expressing the correlation between a plurality of operation terminal devices and information operable therethrough is generated, and such correlation information is output to such operation terminal devices.

Such correlation information is that by which plurality of the operation terminals under connection can individually be identified, or information for symbolizing that operable through the operation terminals, both of which can preferably be displayed on display means provided to each of said operation terminal devices.

According to such present invention, the individual operators of the individual operation terminal devices can readily recognize the correlation between such individual operation terminal devices and information operable therethrough.

Other and further objects and features of the present invention will become obvious upon understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION

Figure 1:
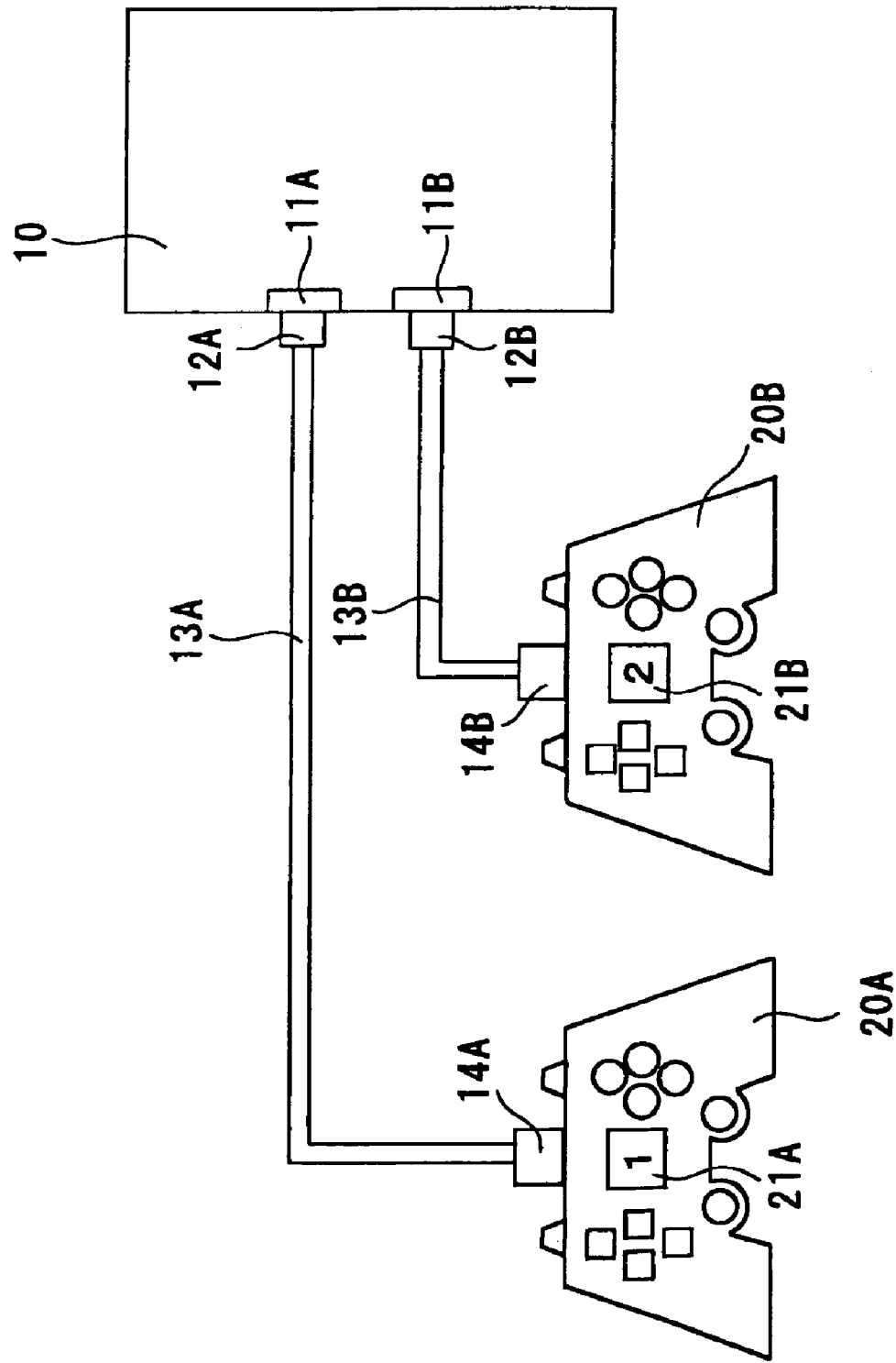
FIG. 1 is a schematic drawing showing an exemplary constitution of a principal portion of an entertainment system according to a first embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

FIG. 1 shows an exemplary constitution of a principal portion of an entertainment system as a first embodiment of the present invention, in which an entertainment device (e.g., a video game machine 10) and controllers (i.e., two controllers 20A, 20B in FIG. 1) as a plurality of operation terminal devices operable by the users (players) are connected with cables 13A, 13B, respectively.

In such example shown in FIG. 1, the cable 13A is electrically connected with the video game machine 10 by inserting a plug-in connector 12A provided on one end thereof into a controller port 11A, and with the controller 20A by inserting a plug-in connector 14A provided on the other end thereof into a connection port (not shown) of the controller 20A. On the other hand, the cable 13B is electrically connected with the video game machine 10 by inserting a plug-in connector 12B provided on one end thereof into a controller port 11B, and with the controller 20B by inserting a plug-in connector 14B provided on the other end thereof into a connection port (not shown) of the controller 20B.

The controllers 20A and 20B have display portions 21A and 21B, respectively, at a position readily recognizable by the players, where details of the constitution including the appearance thereof will be described later. Such display portions 21A and 21B are, for example, capable of providing display recognizable by the players, and can be composed of a liquid crystal display panel, an organic or inorganic electro-luminescence (EL) panel, a segment display device, and LED (light emitting diode) or the like.

Contents to be displayed on the individual display portions 21A and 21B relate to correlation information expressing the correlation between the individual controllers and game characters, which includes the numbers transmitted as being assigned to the individual controllers by the video game machine 10 (referred to as "controller number" hereinafter); icons or symbols for identifying the individual controllers; and icons or symbols for symbolizing, for example, the game characters operable through the individual controllers.

Now the icon symbolizing the game character refers to a real illustration thereof or an abstract expression thereof.

The contents displayed on the display portions 21A and 21B are not limited to the controller numbers or character icons, but can most simply be given by a plurality of LEDs (light emitting diodes), the number of which corresponding to the number of the controllers, and allowing an LED corresponding to a specific controller number assigned to such controller to be illuminated.

That is, it is sufficient enough for the display portions 21A and 21B to display at least the controller numbers or the like which are assigned by the video game machine 10 to the individual controllers 20A and 20B, to thereby make the players recognize them explicitly. In the exemplary case shown in FIG. 1, the controller number "1" appears on the display portion 21A of the controller 20A, and the controller number "2" appears on the display portion 21B of the controller 20B.

Providing such display on the display portions 21A and 21B of the individual controllers 20A and 20B allows the players to confirm that which game character is controllable through the controller in their own hands.

Figure 2:
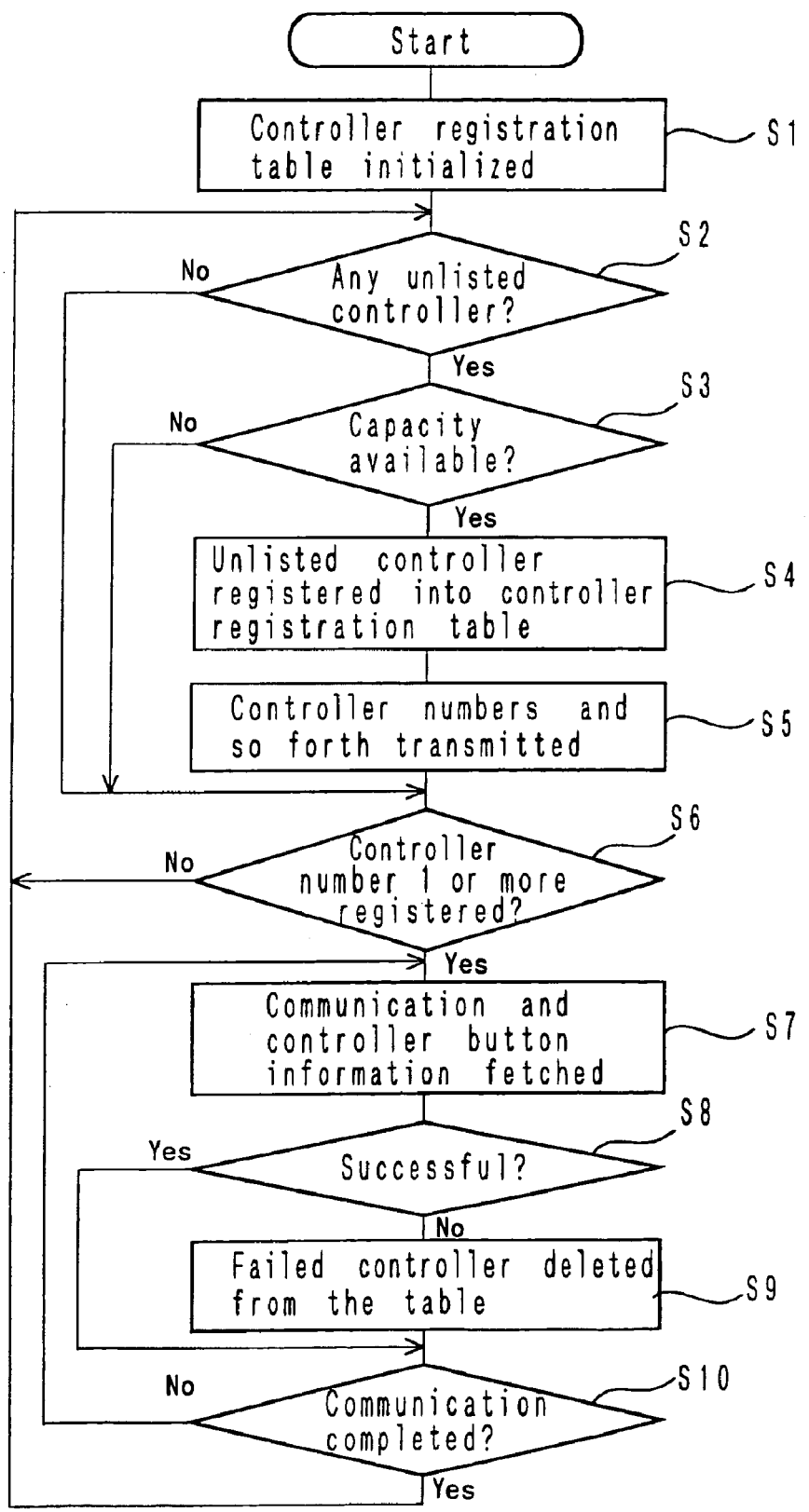
FIG. 2 is a flow chart showing a process flow of a controller connection management program.

To enable such display of the controller numbers, character icons or the like on the display portions of the individual controllers, the video game machine 10 of this embodiment performs recognition and management of the controllers under connection, as well as transmission of information (correlation information) to be displayed on the display portions of the individual controllers, according to an algorithm (referred to as "controller connection management program") typically expressed by a flow chart shown in FIG. 2.

FIG. 2 shows a process flow in the video game machine for the case that the controller numbers are to be displayed on the display portions of the individual controllers. The processing shown in FIG. 2 is conducted by running the controller connection management program contained in a game application program or in a device driver program mainly on a CPU (central processing unit) of the video game machine. Constitution of an internal circuit of such video game machine will be described later.

In the example shown in FIG. 2, upon starting of the controller connection management program, such program first prepares in step S1 a controller registration table on, for example, a RAM (random access memory) in the video game machine, and then initializes the table.

Processing following the step S1 will start, for example, at a point of time when the controllers are connected to the video game machine in a power-supplied state. More specifically, as for the case of the first embodiment shown in FIG. 1, the processing can start only after the controllers 21A and 21B are connected to the controller ports 11A and 11B of the video game machine 10 via the cables 13A and 13B, respectively.

Now, the controller registration table refers to a table for registering and managing the controllers whose connections to the video game machine have been confirmed, and is designed so as to register a maximum number of the controllers available for the game application program.

For a game allowing the participation of four players for example, a maximum number of the controllers in such controller registration table can be four.

In each cell of the controller registration table, information necessary for the controller under connection to communicate with the video game machine (e.g., site of the connection, a serial number of the controller, radio communication frequency) will have been recorded.

Each cell of the controller registration table previously contains a controller number, character icon or so, which is read out by request.

The controller number or a character icon read out from such controller registration table is transmitted to the controller registered to such table, and displayed on the display portion of the controller, to thereby allow the player to confirm the correlation between the controller and the game character.

If any controller fails in communication with the major unit of the video game machine, it is assumed that such controller is disconnected from the major unit of the video game machine or such video game machine is disconnected from a power source, which results in deletion of information about such controller from the controller registration table.

Upon completion of the initialization of the controller registration table in step S1, the controller connection management program will detect in step S2 any operation controller unlisted in said table, where the process skips to step S6 if no unlisted controller is detected, and goes to step S3 if any unlisted controller is detected.

In step S3, the controller connection management program will judge whether the controller registration table still has a free capacity or not (i.e., whether the table contains a maximum number of controllers or not), where the process skips to step S6 if no capacity is available, and goes to step S4 if any capacity is available.

In step S4, the controller connection management program registers such unlisted controller into the controller registration table, and then goes to step S5.

In step S5, the controller connection management program transmits a controller number, character icon or the like previously contained in a cell (registration site) on the controller registration table to the individual controllers connected to the video game machine.

More specifically, for the exemplary case of the first embodiment shown in FIG. 1, information such as a controller number or a character icon assigned by the controller connection management program is transmitted from the video game machine 10 to the controllers 21A and 21B through the cables 13A and 13B, respectively.

In the exemplary case of the first embodiment shown in FIG. 1, controller number "1" for example is sent to the controller 20A, and controller number "2" for example is sent to the controller 20B. This allows the display portion 21A of the controller 20A to show the controller number "1", and the display portion 21B of the controller 20B to show the controller number "2". Upon completion of the process in step S5 the process then goes to step S6.

In step S6, the controller connection management program judges whether one or more controllers are registered in the controller registration table, where the process goes back to step S2 for the case with no controller registered, and goes to step S7 for the case with one or more controllers registered.

In step S7, the controller connection management program communicates with the controller registered in such controller registration table, tries to fetch information about various buttons provided on the controller, details of which will be described in later, and then goes to step S8.

In step S8, the controller connection management program judges whether such trail for fetching information about the buttons on the controller was successful or not, that is, whether the communication with the controller was successful or not, where the process skips to step S10 for the case the communication was successful, and goes to step S9 for the case the communication resulted in failure.

Now according to such success/failure judgment of the communication in the foregoing steps S7 and S8, the events such that the controller once succeeded in the communication was disconnected later from the major unit of the video game machine or such that a power source was disconnected can also be detected.

In step S9, the controller connection management program deletes the controller which have failed in the communication from the controller registration table, and then goes to step S10.

In step S10, the controller connection management program judges whether the communication completed between the video game machine and all of the controller registered in the controller connection management table or not, where the process goes back to step S7 for the case the communication did not complete yet, and goes back to step S2 for the case all processing completed.

By virtue of such processing, the entertainment system of the first embodiment can provide recognition and management of the controllers under connection, and can provide display of a controller number or a character icon on the display portion of each controller.

Figure 3:
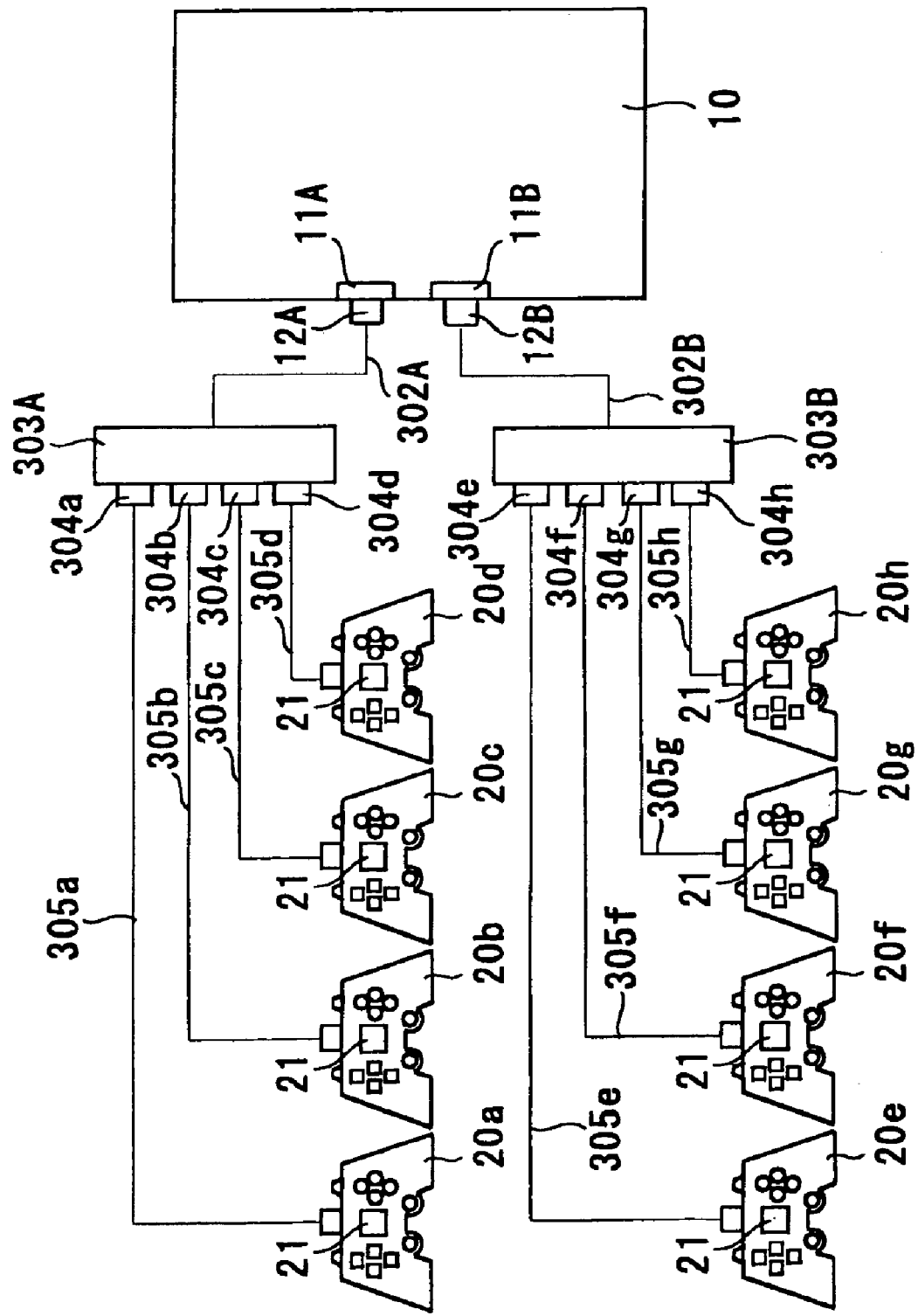
FIG. 3 is a schematic drawing showing an exemplary constitution of a video game machine having a plurality of controllers connected using a port duplicator.

While FIG. 1 exemplifies the case in which the controller ports 11A and 11B of the video game machine 10 are connected to the controllers 20A and 20B, respectively, in an one-to-one manner using the cables, the first embodiment is also applicable for a case shown in FIG. 3, in which one-to-multi cable connection is accomplished using port duplicators 303A and 303B. In such case, the controller numbers or so sent by the controller connection management program installed in the video game machine 10 can be displayed on the display portion 21 provided to each of a plurality of controllers 20a to 20h connected via the port duplicators 303A and 303B.

FIG. 3 now shows a case in which the video game machine 10 having two controller ports 11A and 11B is connected with two port duplicators 303A and 303B to thereby allow eight controllers 20a to 20h to be connected thereto.

In such case shown in FIG. 3, the controller port 11A of the video game machine 10 is connected with the port duplicator 303A via the plug-in connector 12A and the cable 302A. The port duplicator 303A has four taps (controller connection slots) 304a to 304d to which the controllers 20a to 20d are connected respectively through the cables 305a to 305d. Similarly, the controller port 11B of the video game machine 10 is connected with the port duplicator 303B via the plug-in connector 12B and the cable 302B, and such port duplicator 303B has four taps (controller connection slots)

304e to 304h to which the controllers 20e to 20h are connected respectively through the cables 305e to 305h.

For the case where a plurality of controllers are connected to a single video game machine as shown in the above, the controller connection management program identifies the controllers based on the tap position (tap number) of the port duplicators to which the controllers are connected. In an exemplary case shown in FIG. 3, assuming that the controller port 11A of the video game machine 10 has a port number of "1", and the controller port 11B has a port number of "2", and the taps 304e to 304h of the port duplicator 303A have tap numbers of "1" to "4", respectively, the controller connection management program assigns a controller number "1—1" to the controller 20a, "1-2" to the controller 20b, "1-3" to the controller 20c and "1-4" to the controller 20d. The controller 20e to 20h can similarly have the controller numbers of "2-1" to "2-4". The controller connection management program transmits such controller numbers to the corresponding controllers 20a to 20h, which will respectively appear on the display portion 21 of the corresponding controllers 20a to 20h.

Second Embodiment

Figure 4:
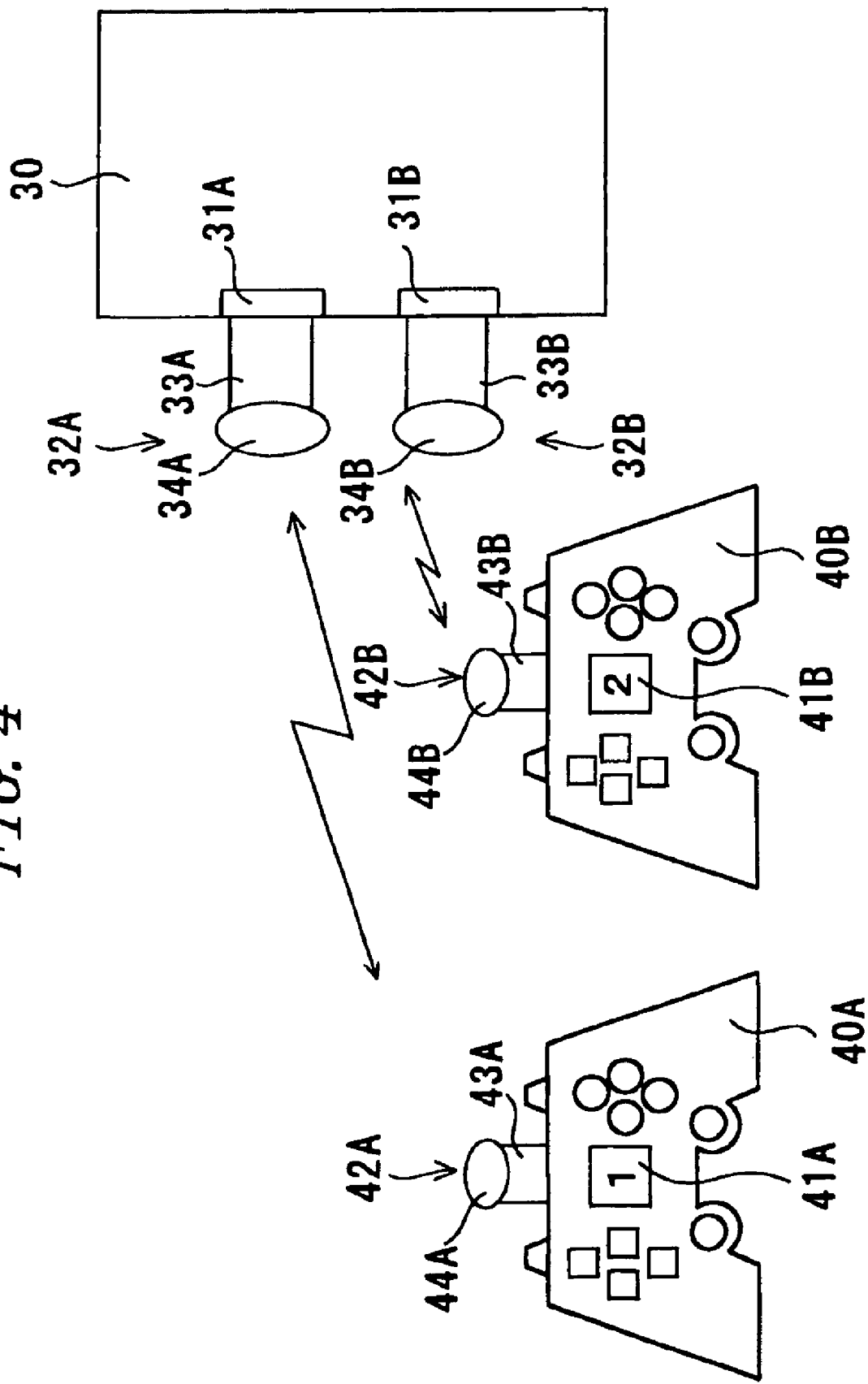
FIG. 4 is a schematic drawing showing an exemplary constitution of a principal portion of an entertainment system according to a second embodiment.

FIG. 4 shows an exemplary constitution of a second embodiment in which a video game machine 30 and a plurality of controllers (i.e., two controllers 40A and 40B in FIG. 4) communicate with each other by one-to-one, bi-directional radio connection using transceivers.

In such example shown in FIG. 4, a transceiver 32A comprises a connector portion 33A having a communication circuit incorporated therein for effecting the bi-directional radio communication and a radio communication antenna 34A, where the connector portion 33A of such transceiver 32A is inserted into the controller port 31A of the video game machine 30 to thereby accomplish electrical connection. Similarly, a transceiver 32B comprises a connector portion 33B having a communication circuit incorporated therein for effecting the bi-directional radio communication and a radio communication antenna 34B, where the connector portion 33B of such transceiver 32B is inserted into a controller port 31B of the video game machine 30 to thereby accomplish electrical connection.

A transceiver 42A comprises a connector portion 43A having a communication circuit incorporated therein for effecting the bi-directional radio communication and a radio communication antenna 44A, where the connector portion 43A of such transceiver 42A is inserted into the controller port (not shown) of the controller 40A to thereby accomplish electrical connection.

Similarly, a transceiver 42B comprises a connector portion 43B having a communication circuit incorporated therein for effecting the bi-directional radio communication and a radio communication antenna 44B, where the connector portion 43B of such transceiver 42B is inserted into the controller port (not shown) of the controller 40B to thereby accomplish electrical connection.

The individual transceivers 32A, 32B, 42A and 42B can be those available in bi-directional radio communication based on, for example, a general-purpose, short-range, high-speed radio communication system such as so-called Blue Tooth (registered trade name) or on a dedicated short-range radio communication system. In the case shown in FIG. 4, the transceivers 32A and 42A are involved in a one-to-one radio communication, and the transceivers 32B and 42B are involved in the same.

The controllers 40A and 40B, the details thereof which will be described in later, have display portions 41A and 41B at a position readily recognizable by the players, similarly for the case of the controllers 20A and 20B shown in FIG. 1.

Displays on such display portions 41A and 41B include controller numbers transmitted as being assigned to the individual controllers; or character icons operable through such controllers, which are displayed so as to explicitly be recognized by the players similarly to the case described in the first embodiment.

FIG. 4 now exemplifies a case that a controller number of "1" is displayed on the display portion 41A of the controller 40A, and a controller number of "2" is displayed on the display portion 41B of the controller 40B.

Also in the second embodiment, similarly to the case described in the first embodiment, such displays on the display portions 41A and 41B of the individual controllers 40A and 40B allow each player to confirm which game character is operable through the controller in its own hands.

To enable such display of the controller numbers or character icons on the display portions of the individual controllers, the video game machine of the second embodiment recognizes and manages the controllers under connection and transmits displayed information to the display portion of the individual controllers based on a process flow described below.

It is now to be noted that the process flow by the controller connection management program in the second embodiment is approximately the same with that explained with reference to the flow chart in FIG. 2, so that the description below will be given only about the issues different from those in the first embodiment.

In the second embodiment, the controller connection management program starts the process of step S1 in FIG. 2 upon establishment of the radio communication between the transceiver 32 (32A, 32B) connected to the video game machine 30 and the transceiver 42 (42A, 42B) connected to the controller 40 (40A, 40B) The processes from steps S1 to S4 are basically the same with those described in the first embodiment.

In step S5 of the second embodiment, the controller connection management program sends information such as the controller numbers or character icons to the controllers 40A and 40B through radio communication between the transceiver 32 on the side of the video game machine 30 and the transceiver 42 on the side of the controller 40.

In the exemplary case of the second embodiment in FIG. 4, controller number "1" is sent to the controller 40A, and controller number "2" is sent to the controller 40B. This results in displaying controller number "1" on the display portion 41A of the controller 40A, and controller number "2" on the display portion 41B of the controller 40B. The processes from steps S6 to S10 are basically the same with those described in the first embodiment.

Such processing allows the entertainment system of the second embodiment to recognize and manage the controllers under connection, and to display the controller numbers, character icons or the like on the display portions of the individual controllers.

Third Embodiment

Figure 5:
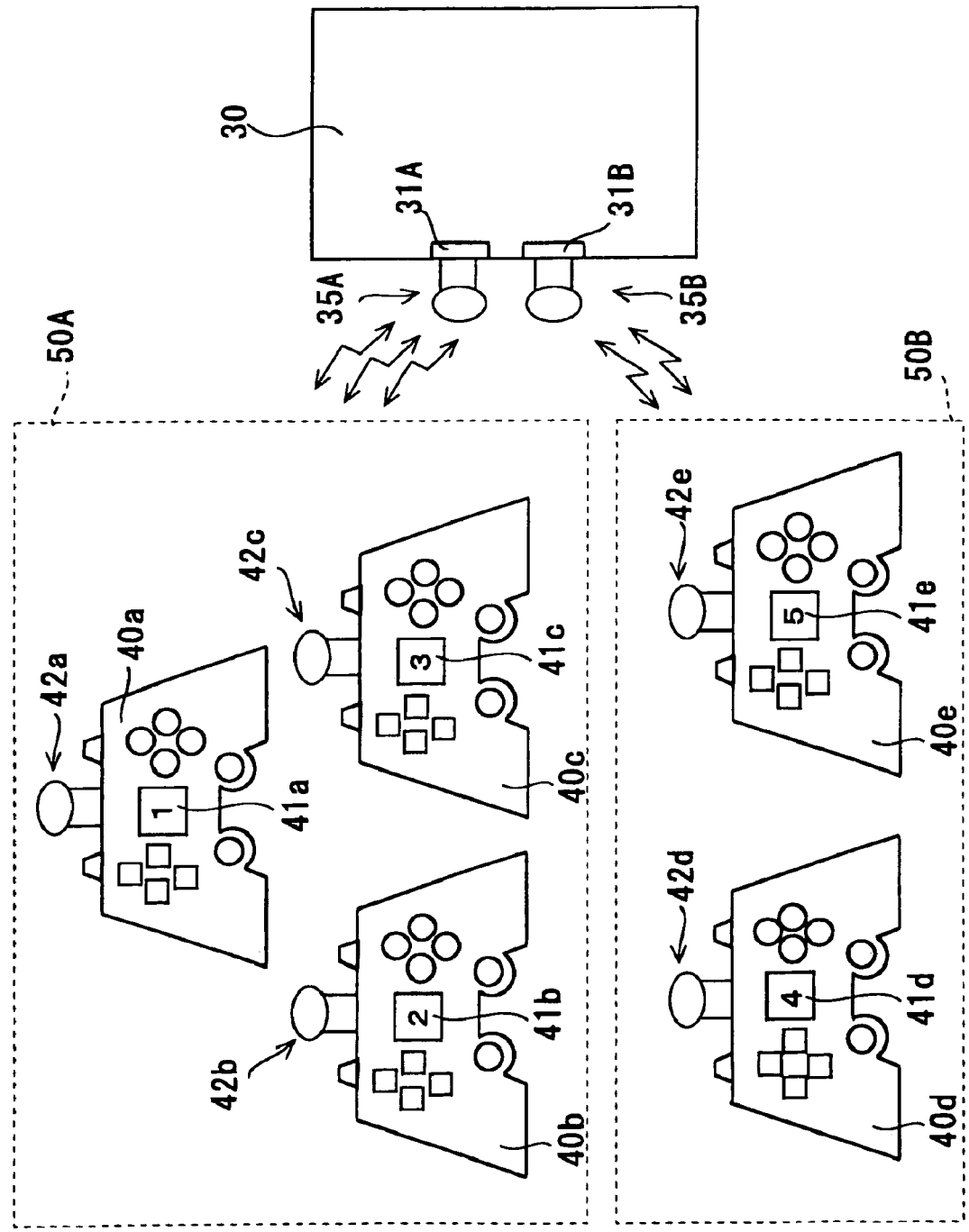
FIG. 5 is a schematic drawing showing an exemplary constitution of a principal portion of an entertainment system according to a third embodiment.

FIG. 5 shows an exemplary constitution of a third embodiment in which a video game machine 30 and a plurality of controllers (i.e., five controllers 41a to 41e in FIG. 5) communicate with each other by one-to-multi, bi-directional radio connection using transceivers.

In such example shown in FIG. 5, the transceivers 42a to 42e are inserted into the controllers 40a to 40e to thereby accomplish electrical connection, similarly to the case shown in FIG. 4.

On the other hand, the transceivers 35A and 35B are inserted into the controller ports 31A and 31B of the video game machine 30 to thereby accomplish electrical connection, similarly to the case shown in FIG. 4. The transceivers 35A and 35B are now provided respectively with a communication circuit capable of one-to-multi, bi-directional communication using a plurality of transceivers on the controller side based on the time-division radio communication or frequency-division radio communication.

The exemplary case shown in which FIG. 5, the transceiver 35A on the side of the video game machine 30 establishes radio communication with the transceivers 42a to 42c on three respective controllers 40a to 40c (referred to as a controller group 50A, hereinafter) in a one-to-three manner, and the transceiver 35B establishes radio communication with the transceivers 42d and 42e on two respective controllers 40d and 40e (referred to as a controller group 50B, hereinafter) in a one-to-two manner.

The individual controllers 40a to 40e in the third embodiment have display portions 41a to 41e similarly to the foregoing embodiments, on which the controller numbers, character icons or so assigned by the video game machine 30 are displayed so as to explicitly be recognized by the players.

Now in the case exemplified in FIG. 5, controller number "1" is displayed on the display portion 41a of the controller 40a, controller number "2" is displayed on the display portion 41b of the controller 40b, and similarly a controller number "3" on the display portion 41c of the controller 40c, controller number "4" on the display portion 41d of the controller 40d, and controller number "5" on the display portion 41e of the controller 40e.

Also in the third embodiment, similarly to the case described in the first and second embodiments, such displays on the display portions 41a to 41e of the individual controllers 40a to 40e allow each player to confirm which game character is operable through the controller in their own hands.

It is now to be noted that the process flow by the controller connection management program installed in the video game machine in the third embodiment is approximately the same with that explained with reference to the flow chart in FIG. 2, so that the description below will be given only about the issues different from those in the first and second embodiments.

In the third embodiment, the controller connection management program starts the process of step S1 in FIG. 2 upon establishment of the radio communication between the transceivers 35A and 35B connected to the video game machine 30 and the transceivers 42a to 42e connected to the controllers 40a to 40e. The processes from steps S1 to S4 are basically the same with those described in the first and second embodiments.

Figure 6:
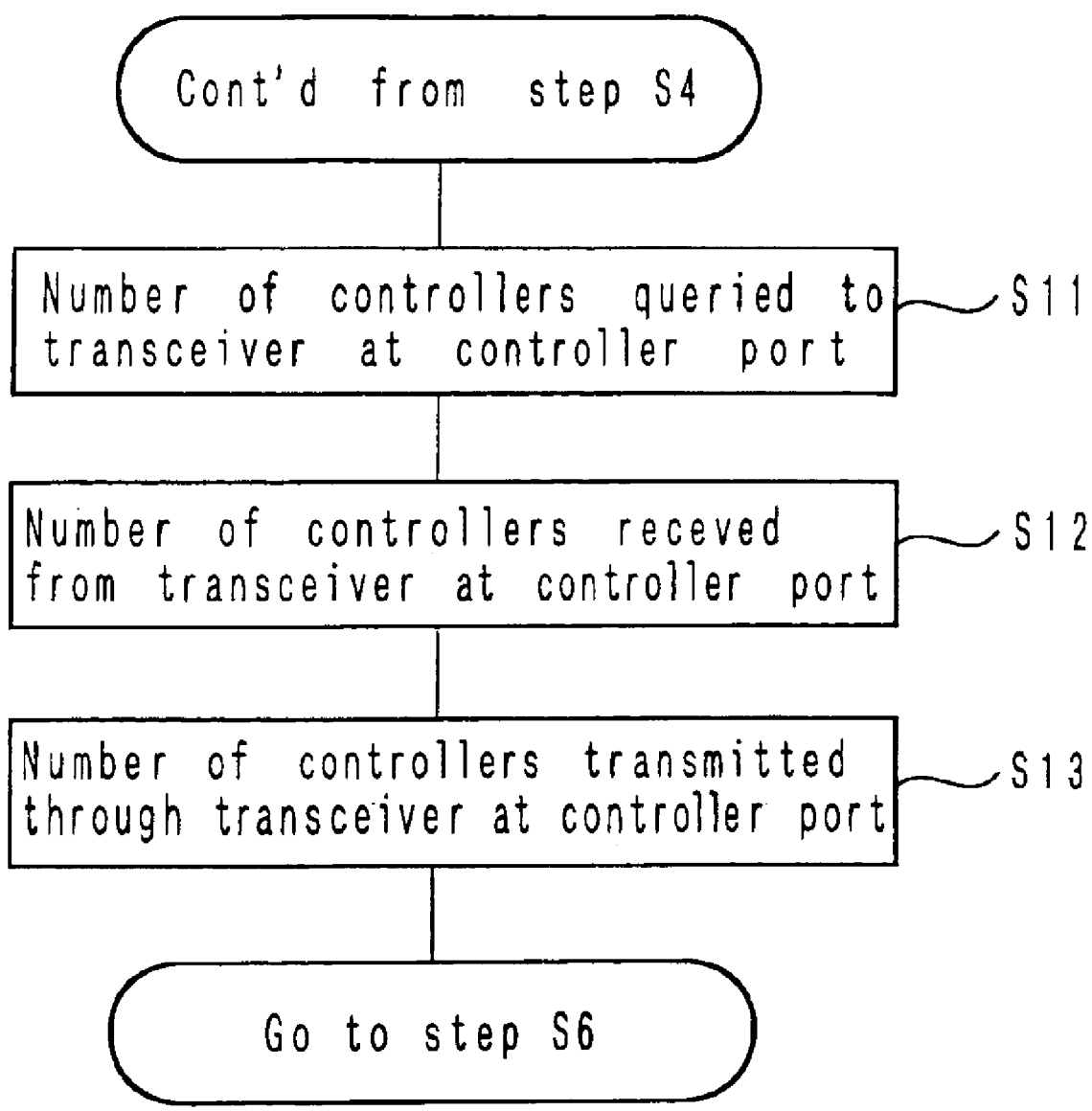
FIG. 6 is a flow chart showing a process flow of a controller connection management program by which controller numbers or so are transmitted for the case of one-to-multi radio connection.

In step S5 of the third embodiment, the controller connection management program executes, for example, processing shown in FIG. 6.

That is, in step S5 of the third embodiment, the controller connection management program first queries in step S11 the transceivers 35A and 35B about the number of the controllers connected thereto under radio connection.

Next in step S12, the controller connection management program receives from the transceivers 35A and 35B the number of the controllers individually being connected thereto under radio connection. For the case shown in FIG. 5 for example, the transceiver 35A is under radio connection with the controller group 50A, and the transceiver 35B is under radio connection with the controller group 50B, so that the controller connection management program receives from the transceiver 35A the number of the controllers of "3", and from the transceiver 35B the number of the controllers of "2".

After receiving the number of the controllers, the controller connection management program then in step S13 sends all of such numbers of the controllers respectively related to the transceivers 35A and 35B to the controllers 40a to 40e under radio connection through such transceivers 35A and 35B, or sends only the top numbers of the controllers respectively to the transceivers 35A and 35B, and makes such transceivers 35A and 35B to send such top numbers and the succeeding controller numbers to the controllers 40a to 40e under radio connection.

More specifically for the case where all of the controller numbers are sent from the transceivers to the controllers under radio connection, the controller connection management program sends the controller numbers "1", "2" and "3" to the transceiver 35A, and such transceiver 35A then sends controller number "1" to the controller 40a, controller number "2" to the controller 40b and controller number "3" to the controller 40c.

The controller connection management program also sends the controller numbers "4" and "5" to the transceiver 35B, and such transceiver 35B then sends controller number "4" to the controller 40d and controller number "5" to the controller 40e.

On the other hand, for the case where only the top numbers of the numbers of the controllers are sent to the transceivers, and such top numbers and the succeeding numbers are sent from such transceivers to the controllers, the controller connection management program sends to the transceivers 35A and 35B the top numbers of the number of the controllers respectively connected thereto.

The controller connection management program now defines an order of the allocation of the top numbers for the individual transceivers connected to the controller ports (or may previously be defined), and then sends such top numbers, not overlapping with each other, to the individual transceivers according to such order of the allocation.

That is, in the third embodiment shown in FIG. 5, for the case the transceiver 35A has the first priority for the allocation of the top number and the transceiver 35B has the second priority, the controller connection management program sends to the transceiver 35A a top number of "1", and sends to the transceiver 35B a top number of "4" which is larger than "1" by 3 representing the number of the controllers connected to the transceiver 35A.

The transceivers 35A and 35B in such case are designed to send the received top numbers and the succeeding numbers in for example an ascending order. So that the transceiver 35A sends for example a controller number of "1" to the controller 40a, a controller number of "2" to the controller 40b and a controller number of "3" to the controller 40c; and the transceiver 35B sends for example a controller number of "4" to the controller 40d and a controller number of "5" to the controller 40e.

This results in displaying the controller number "1" on the display portion 41a of the controller 40a, the controller number "2" on the display portion 41b of the controller 40b, the controller number "3" on the display portion 41c of the controller 40c, the controller number "4" on the display portion 41d of the controller 40d, and the controller number "5" on the display portion 41e of the controller 40e.

After completion of step S13 in FIG. 6, the process goes to step S6 in FIG. 2. The processes from steps S6 to S10 are basically the same with those described in the first and second embodiments. It is now also allowable to execute steps S11 and S12 other than before S5 (after step S1, for example).

Such processing allows the entertainment system of the third embodiment to recognize and manage the controllers connected in a one-to-multi manner, and to display the controller numbers on the display portions of the individual controllers. Thus according to the third embodiment, displaying the controller numbers on the display portions 41a to 41e of the respective controllers 40a to 40e allows each player to confirm which game character is controllable through the controller in their own hands, similarly to the foregoing first and second embodiments.

Fourth Embodiment

Figure 7:
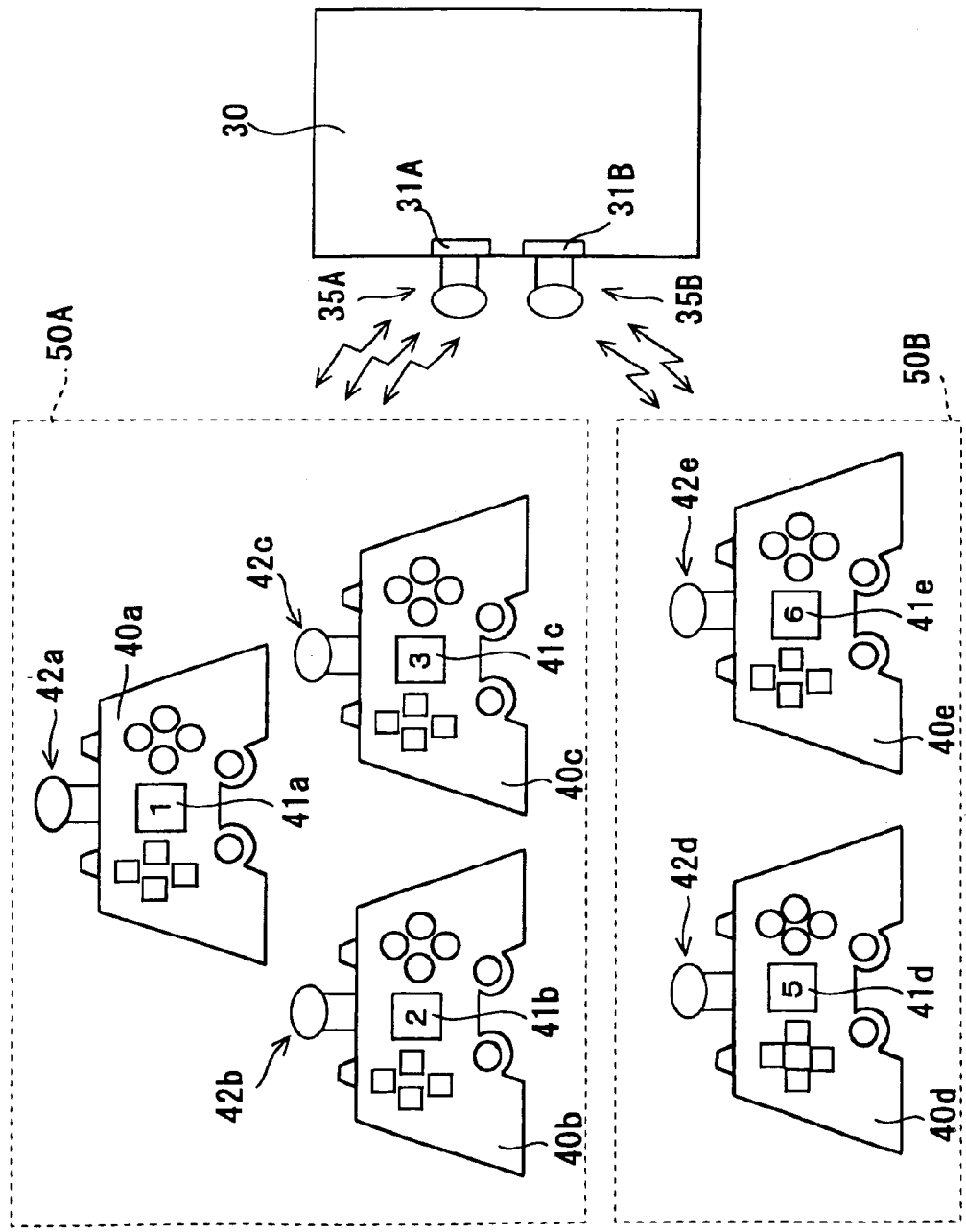
FIG. 7 is a schematic drawing showing an exemplary constitution of a principal portion of an entertainment system according to a fourth embodiment.

FIG. 7 shows an exemplary constitution of a fourth embodiment in which a video game machine 30 and a plurality of controllers (controllers 41a to 41e) communicate with each other by one-to-multi, bi-directional radio connection using transceivers, similarly to the case shown in FIG. 5. The constitution shown in FIG. 7 is basically the same with that shown in FIG. 5, so that detailed description thereof will be omitted.

It is now be noted that the case of the fourth embodiment shown in FIG. 7 differs from the case of the third embodiment shown in FIG. 5 in that the controller number is determined depending on a maximum allowable number of the controllers under the radio connection with the transceivers, in place of being determined depending on the actual number of the controllers under the radio connection with the individual transceivers at the controller ports.

FIG. 7 shows an exemplary case in which a maximum allowable number of the controllers under the radio connection with the individual transceivers 35A and 35B is set to "4", and the controller numbers of "1", "2", "3", "5" and "6" are displayed respectively on the display portions 41a to 41e of the controllers 40a to 40e.

The processing in step S5 in FIG. 2 in the controller connection management program of the fourth embodiment, in which the controller numbers are determined depending on a maximum allowable number of the controllers under the radio connection with the transceivers, will be explained referring to the flow chart shown in FIG. 6.

It is now to be noted that the process flow by the controller connection management program in the fourth embodiment is approximately the same with that explained referring to the flow chart in FIGS. 2 and 6, so that the description below will be given only about the issues different therefrom.

The controller connection management program in the fourth embodiment queries in step S11 in FIG. 6 the transceivers 35A and 35B on the side of the video game machine 30 about the maximum allowable number of the controllers connectable thereto.

Next in step S12, the controller connection management program receives from the transceivers 35A and 35B the maximum allowable number of the controllers individually connectable thereto. That is, for an exemplary case the maximum allowable number of the connectable controllers is 4, the controller connection management program receives individually from the transceiver 35A and 35B a maximum allowable number for the connectable controllers of "4".

After receiving such maximum allowable number for the connectable controllers, the controller connection management program then in step S13 sends the controller number to the controllers 40a to 40e through the transceivers 35A and 35B in a number equal to such maximum allowable number for the controllers connectable to such transceivers 35A and 35B, or sends only the top controller numbers respectively to the transceivers 35A and 35B, and causes such transceivers 35A and 35B to send such top numbers and the succeeding controller numbers to the controllers 40a to 40e.

More specifically for the case where the controller numbers are sent from the transceivers to the controllers in a number equals to such maximum allowable number for the controllers connectable to such transceivers, the controller connection management program sends the controller numbers "1", "2", "3" and "4" to the transceiver 35A, and sends the controller numbers "5", "6", "7" and "8" to the transceiver 35B. The transceiver 35A receiving such controller numbers sends the controller numbers "1", "2" and "3" to the controllers 40a, 40b and 40c under radio connection, while keeping the controller number "4" in pending since the destination thereof is absent. The transceiver 35B sends the controller numbers "5" and "6" to the controllers 40d and 40e under radio connection, while keeping the controller numbers "7" and "8" in pending since the destinations thereof are absent.

On the other hand, for the case where only the top controller numbers are sent to the transceivers, and such top numbers and the succeeding numbers are sent from such transceivers to the controllers, the controller connection management program sends to the transceivers 35A and 35B the top numbers of the maximum allowable number of the controllers respectively connectable thereto.

The controller connection management program now defines an order of the allocation of the top numbers of the maximum allowable number for the connectable controllers for the individual transceivers connected to the controller ports (or may previously be defined), and then sends such top numbers, not overlapping with each other, to the individual transceivers according to such order of the allocation.

That is, in the fourth embodiment shown in FIG. 7, for the case the transceiver 35A has the first priority for the allocation of the top number and the transceiver 35B has the second priority, the controller connection management program sends to the transceiver 35A a top number of "1", and sends to the transceiver 35B a top number of "5" which is larger than "1" by 4 representing the maximum allowable number of the controllers connectable to the transceiver 35A.

The transceivers 35A and 35B in such case are designed to send the received top number and the succeeding numbers for example in an ascending order. So that the transceiver 35A sends for example a controller number of "1" to the controller 40a, a controller number of "2" to the controller 40b and a controller number of "3" to the controller 40c; and the transceiver 35B sends for example a controller number of "5" to the controller 40d and a controller number of "6" to the controller 40e.

This results in displaying the controller number "1" on the display portion 41a of the controller 40a, the controller number "2" on the display portion 41b of the controller 40b, the controller number "3" on the display portion 41c of the controller 40c, the controller number "5" on the display portion 41d of the controller 40d, and the controller number "6" on the display portion 41e of the controller 40e. The process then goes to step S6 in FIG. 2.

Such processing allows the entertainment system of the fourth embodiment to recognize and manage the controllers connected in a one-to-multi manner, and to display the controller numbers on the display portions of the individual controllers.

Also the fourth embodiment allows the players to confirm that which game character is controllable through the controller in their own hands, similarly to the foregoing third embodiment.

It is now also allowable to assign the controller numbers to the controllers 40a to 40e in a descending order although the cases described in the foregoing third and fourth embodiments employed an ascending order.

It is still also allowable to assign arbitrary controller numbers so far as such numbers do not overlap with each other and so far as the correlation with the game characters is evident, in place of allocating the successive numbers in an ascending or descending order.

It is even allowable to display character icons on the display portions 41a to 41e similarly to the case in the first and second embodiments, in place of displaying the controller numbers.

Fifth Embodiment

The next paragraphs describe a fifth embodiment of the present invention.

Some previous application programs for video game machines do not have a function (program) for sending the controller numbers or character icons to the controllers unlike the controller connection management program described in the first to fourth embodiments. Such previous application programs identify the controllers connected to a video game machine based on the position of the controller ports to which the controllers are connected. For example, a controller connected to a port having a port number of "1" is identified as controller "1", and a controller connected to a port having a port number of "2" is identified as controller "2".

Such numbering for the controllers is, however, only used internally by the application program to identify the controllers, and there is no practice to send such controller numbers to the controllers unlike the foregoing embodiments.

It is also common for the transceiver (e.g., transceivers 32A and 32B in FIG. 4) connected to the controller port of the video game machine to have only a function of sending/receiving data in order to suppress the cost and enhance the generality, and generally does not have a function of recognizing the port numbers to which they are connected and of sending such numbers to the controller.

So that even if the transceivers 32A and 32B for example as shown in FIG. 4 are connected to the controller ports of the video game machine, and the controllers 40A and 40B as shown in FIG. 4 are used, the controller numbers cannot be displayed on the display portions 41A and 41B of such controllers 40A and 40B as far as the video game machine employs the previous application program having no function of sending the controller numbers.

Figure 8:
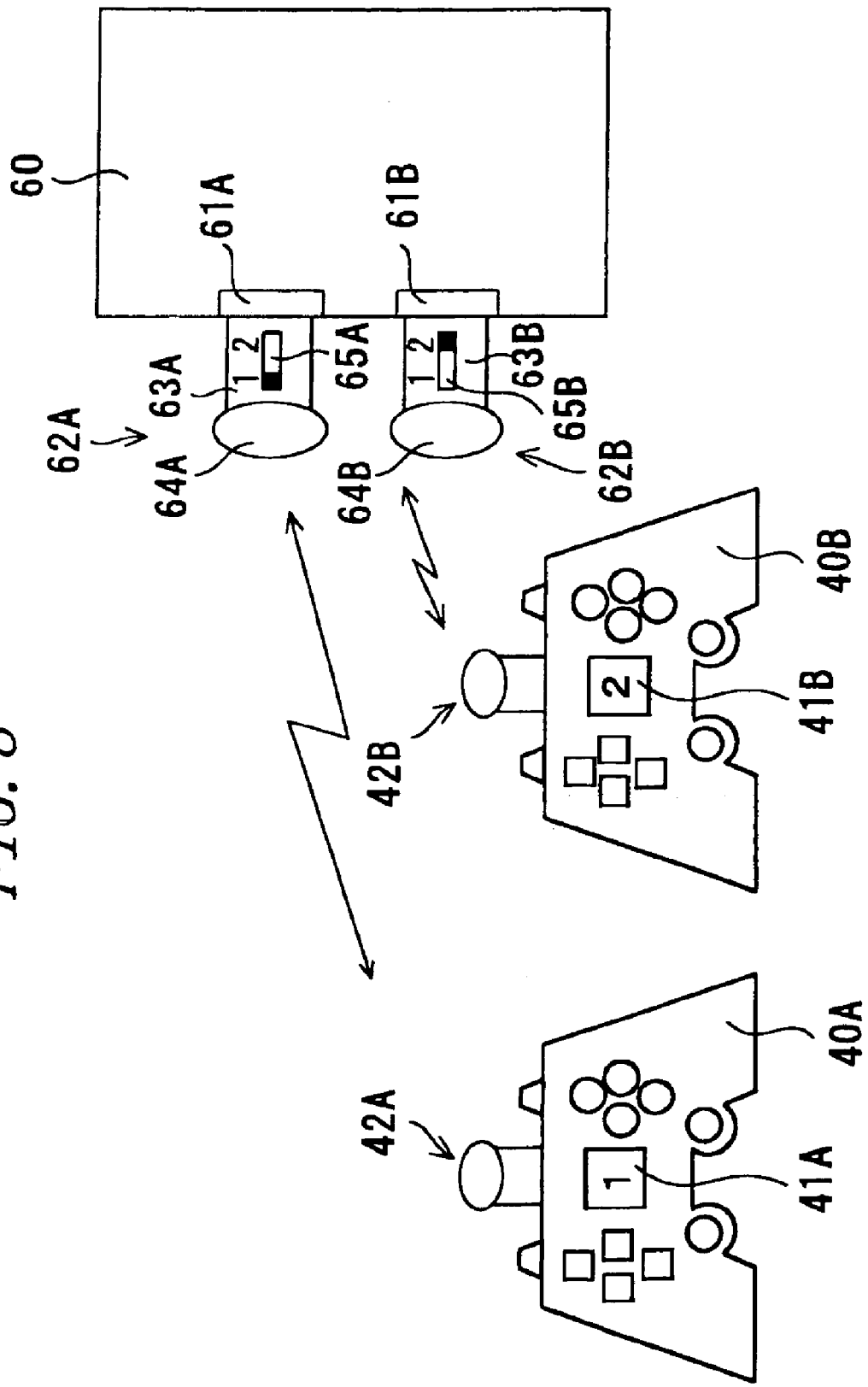
FIG. 8 is a schematic drawing showing an exemplary constitution of a principal portion of an entertainment system according to a fifth embodiment.

Then the fifth embodiment now employs, as shown in FIG. 8, transceivers 62A and 62B with connector portions 63A and 63B which have switches 65A and 65B with which the players can set the numbers and also have built-in communication circuits capable of sending the controller numbers corresponding with the setting of such switches 65A and 65B. Attaching such transceivers 62A and 62B to controller ports 61A and 61B of a video game machine 60 running the previous application program allows the controller numbers to be displayed on the display portions 41A and 41B of the controllers 40A and 40B, respectively.

The case illustrated in FIG. 8 corresponds to that in FIG. 4, so that explanation for portions same as those in FIG. 4 will be omitted.

Figure 9:
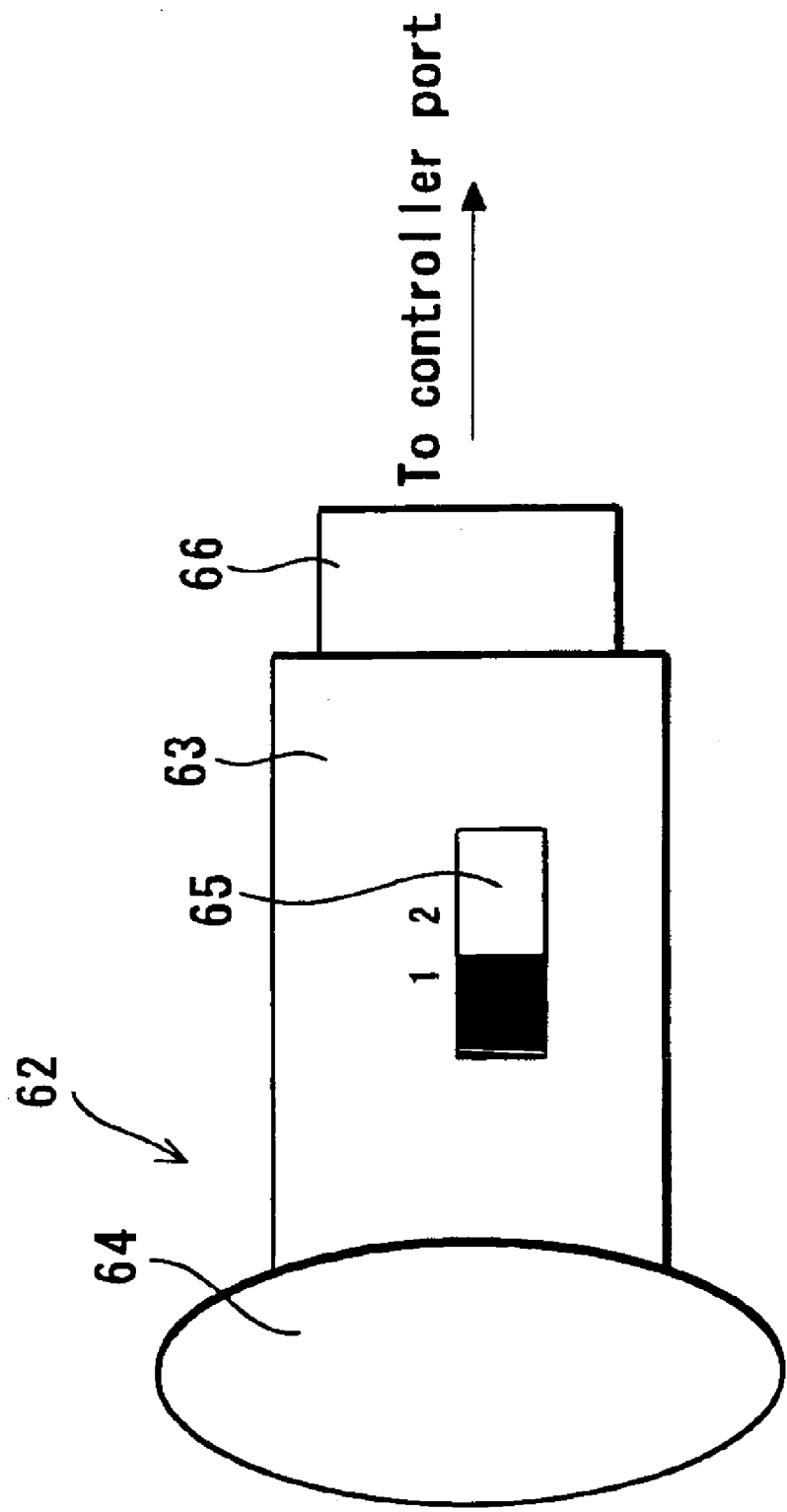
FIG. 9 is a schematic drawing showing a constitution of a transceiver with a switch.

FIG. 9 shows an enlarged view of a transceiver 62 (62A or 62B).

In FIG. 9, the transceiver 62 (62A or 62B) mainly comprises a radio communication antenna 64 (64A or 64B) and a connector portion 63 (63A or 63B), similarly to the transceiver shown in FIG. 4.

At the end portion of the connector portion 63 opposing to an antenna 64, provided is a contact portion 66 to be inserted into a controller port 61 (61A or 61B) to thereby achieve electrical connection. The connector portion 63 also has a switch 65 (65A or 65B) in a position readily recognizable by the player and preferably accessible by the player even when the contact portion 66 is inserted into the controller port 61.

The switch 65 has setting positions in a number corresponding with the number of the controller ports of the video game machine to which the transceiver 62 is connected. For a case the number of the controller port of the video game machine 60 is two for example as shown in FIG. 8, the switch 65 will have two setting positions of "1" and "2" as shown in FIG. 9; whereas the number of the controller port of four requires such switch to have setting positions of "1" to "4".

Switching of the positions of such switch 65 is manually done by the player. For example, the position "1" is selected for the case the transceiver 62 is inserted into the controller port of the video game machine having a port number of "1", and the position "2" is selected for the case such transceiver 62 is inserted into the controller port having a port number of "2".

The communication circuit incorporated into the connector portion 63 generates a controller number corresponding to a position selected on the switch 65, and then sends such number from the radio communication antenna 64 to the controller 40 (40A or 40B).

This allows the display portion 41 of the controller 40 under one-to-one radio communication with the transceiver 62 to display the controller number sent from such transceiver 62.

In an exemplary case shown in FIG. 8 assuming a port number of the controller port 61A of the video game machine 60 as "1", and a port number of the controller port 61B as "2", the switch 65A on the transceiver 62A will be set at position "1", and the switch 65B on the transceiver 62B will be set at position "2", which results in the display of a controller number of "1" on the display portion 41A of the controller 40A under one-to-one communication with the transceiver 62A, and results in the display of a controller number of "2" on the display portion 41B of the controller 40B under one-to-one communication with the transceiver 62B.

Now in such fifth embodiment, the connector portion 63 of the transceiver 62 shown in FIG. 9 is explained as that sending to the controller 40 the controller numbers corresponding to the position of the switch 65, where the controller numbers specified by the controller connection management program can preferentially be sent rather than the controller numbers based on the position of the switch 65 when such transceiver 62 is connected to a video game machine supported by, for example, the controller connection management program described in the second embodiment.

That is, mounting the transceiver 62 shown in FIG. 9 onto a video game machine supported by such controller connection management program allows such transceiver 62 to send the controller number to the controller when such controller numbers are specified by the video game machine, and to send the controller number corresponding to the position set by the switch 65 when the controller number are not specified by the video game machine.

Thus according to the entertainment system according to the fifth embodiment, the controller number is displayed on the display portion 41 of the controller 40 irrespective of whether the video game machine supports the controller connection management program or not.

Sixth Embodiment

Figure 10:
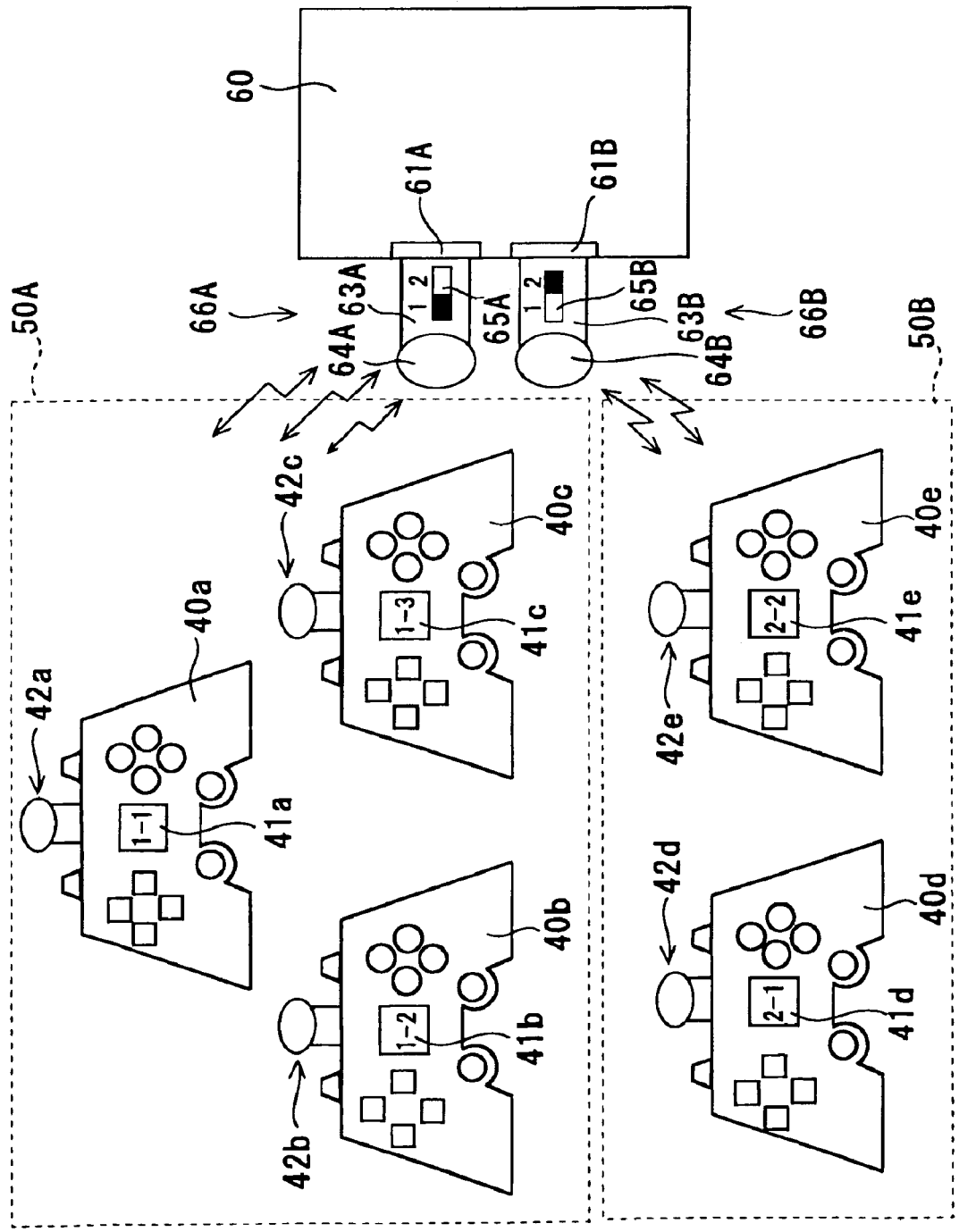
FIG. 10 is a schematic drawing showing an exemplary constitution of a principal portion of an entertainment system according to a sixth embodiment.

While the foregoing fifth embodiment showed an exemplary case in which the one-to-one radio communication is established between the transceiver 62 on the video game machine 60 not supported by the previous controller connection management program and the transceiver 42 on the controller 40, such transceiver having the switch 65 mounted thereon is also applicable to the one-to-multi radio communication between a video game machine not supported by the foregoing controller connection management program and the controllers, as described in the sixth embodiment shown in FIG. 10.

The case illustrated in FIG. 10 corresponds to that in FIG. 5 or FIG. 7, so that explanation for portions same as those in FIG. 5 or FIG. 7 will be omitted.

In one-to-multi communication as described in the sixth embodiment, a communication circuit incorporated in the connector portion 63 (63A, 63B) of the transceiver 66 (66A, 66B) reads a positional set value (i.e., number) of the switch 65 (65A, 65B), and then sends to each of the controller 40 under the radio communication therewith the controller number comprising the read value and a specific number differs for every controller.

This allows the display portions 41 of each controller 40 under one-to-multi radio communication with the transceivers 62 to display the controller number sent from the corresponding transceivers 62.

In an exemplary case shown in FIG. 10 assuming that the controller port 61A of the video game machine 60 has a port number of "1", and the controller port 61B has a port number of "2"; the switch 65A on the transceiver 66A will be set at position "1", and the switch 65B on the transceiver 66B will be set at position "2"; the controllers 40a, 40b and 40c in the controller group 50A under one-to-multi communication with the transceiver 66A will be given with "1", "2" and "3", respectively as numbers differ for every controller, and the controllers 40d and 40e in the controller group 50B under one-to-multi communication with the transceiver 66B will be given with "1" and "2", respectively; which results in the display of a controller number of "1—1" on the display portion 41a of the controller 40a in the controller group 50A, a controller number of "1-2" on the display portion 41b of the controller 40b, and a controller number of "1-3" on the display portion 41c of the controller 40c, and results in the display of a controller number of "2-1" on the display portion 41d of the controller 40d and a controller number of "2—2" on the display portion 41e of the controller 40e.

Now also in such sixth embodiment, for the case that the transceiver 66 is connected to the video game machine supporting the controller connection management program as described in the third or fourth embodiment, it is allowable to give priority to sending of the controller numbers specified by such controller connection management program over the sending of the controller numbers based on the positional setting of the switch 65, similarly to the fifth embodiment.

Thus according to the entertainment system of the sixth embodiment, the controller number is displayed on the display portion 41 of the controller 40 irrespective of whether the video game machine supports the controller connection management program or not.

Figure 11:
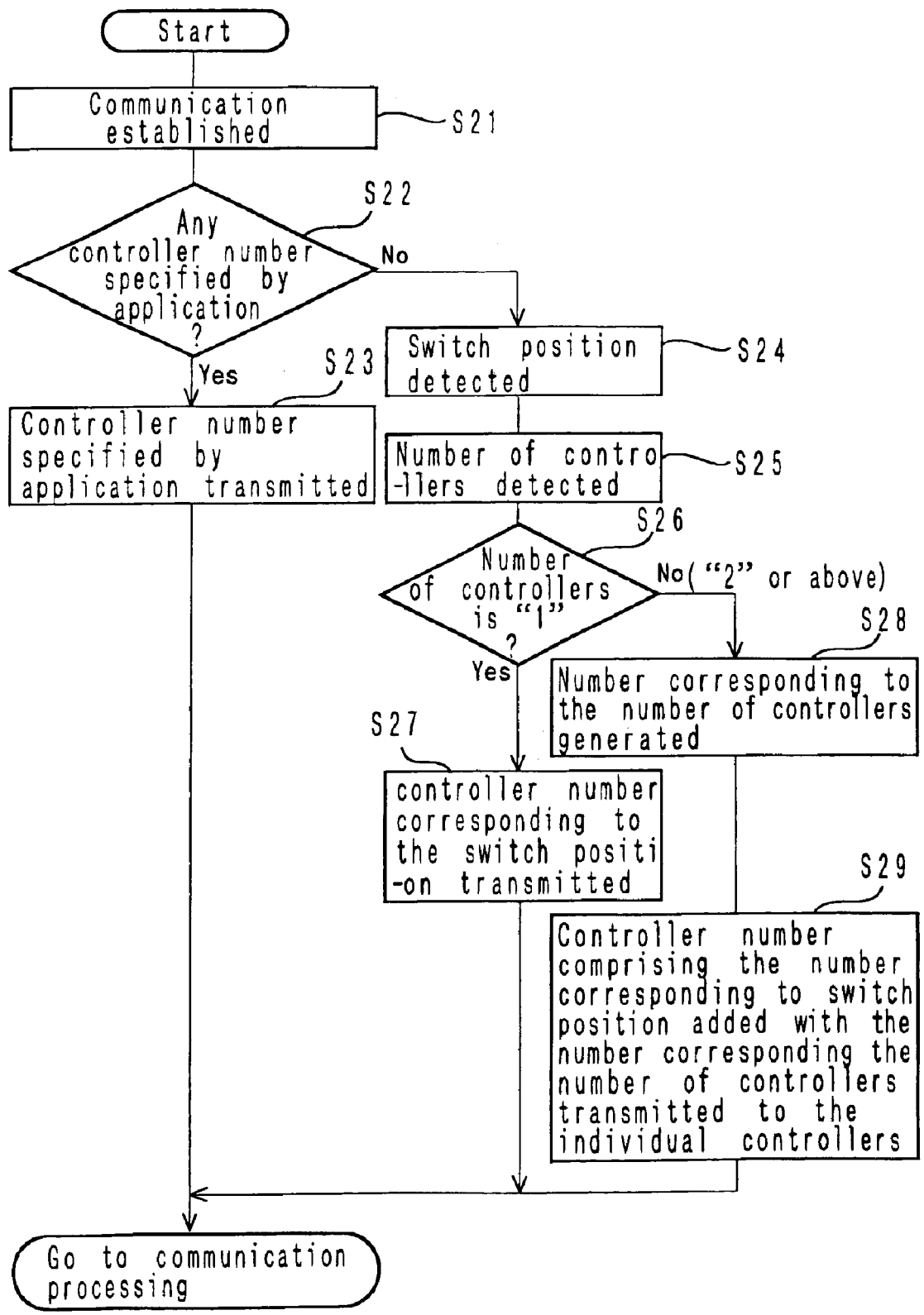
FIG. 11 is a flow chart showing a process flow for the transmission of controller numbers in a transceiver with a switch according to the fifth and the sixth embodiments.

FIG. 11 shows an exemplary case of a communication circuit of the transceiver having the switch described in the fifth and sixth embodiments, in which the video game machine can send the controller numbers irrespective of whether such video game machine supports the controller connection management program or not. A process flow shown in FIG. 11 now can be achieved by a software or a hardware, either will do, within the communication circuit of the transceiver.

As shown in FIG. 11, the communication circuit of the transceiver establishes in step S21 the connection by radio communication between the video game machine and at least one controller, and then judges in step S22 whether the application program of the video game machine specified the controller number or not. For the case where the application program of the video game machine is supported by the controller connection management program and thus the controller number is judged in step S22 as being specified by the video game machine, the communication circuit will send in step S23 the controller number specified by such application program supported by the controller connection management program to the corresponding controller, and then goes to a communication processing routine for playing an actual game or the like.

On the other hand, the processing goes to step S24 if the communication circuit judges in step S22 that the application program of the video game machine is not supported by the controller connection management program and the controller number is thus not specified by such video game machine.

In step S24, the communication circuit detects what position is selected on the switch, and then detects in step S25 the number of the controllers with which the radio communication has already been established.

When the number of the controllers detected in step S25 is "1", the processing of the communication circuit goes to step S27, and is not "1" (i.e., "2" or above), to step S28.

The processing jumping from step S25 to step S27 corresponds to a case of one-to-one communication as in the fifth embodiment, and that jumping from step S25 to step S28 corresponds to a case of one-to-multi communication as in the sixth embodiment.

The communication circuit sends the controller number according to the position of the switch to the corresponding controller in step S27, and then goes into a communication processing routine for playing an actual game or the like.

On the contrary in step S28, the communication circuit generates the number corresponding to the number of the controllers with which the radio communication has already been established, and then sends in step S29 the controller number, comprising the number corresponding to the position of the switch added with the number corresponding to the number of the controllers, to the corresponding controller. Thereafter the process goes into a communication processing routine for playing an actual game or the like.

The transceiver described in the fifth and sixth embodiments is thus accomplished.

Figure 12:
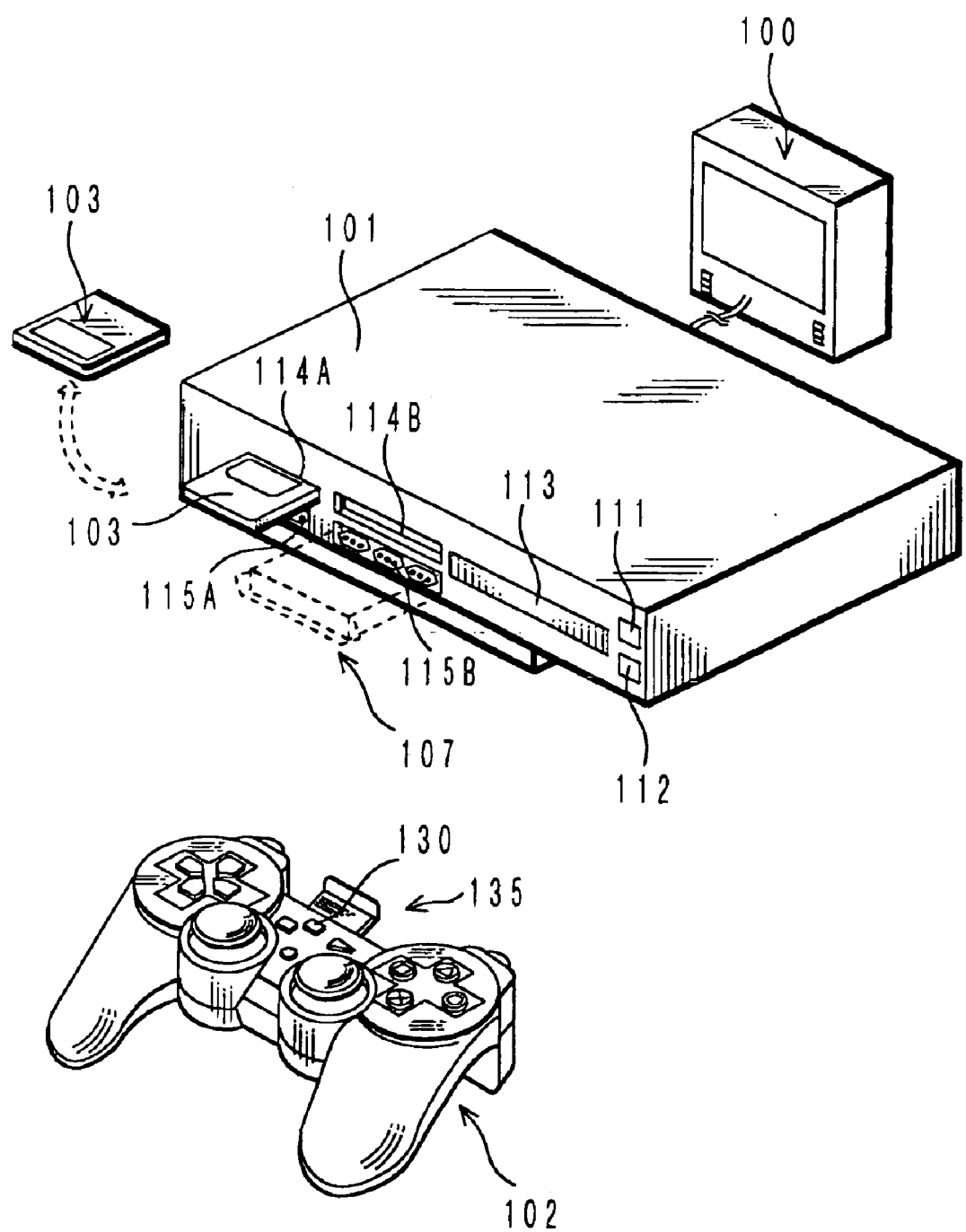
FIG. 12 is a perspective view showing an exemplary entire constitution of the entertainment system according to the individual embodiments of the present invention.

FIG. 12 shows an overall constitution of the entertainment system comprising the video game machine and the controller according to any one of the foregoing embodiments. While FIG. 12 exemplifies the case in which the video game machine and the controller are under radio communication as explained in the second to sixth embodiments, the video game machine and the controller may be under cable connection using the cable as explained in the first embodiment.

The entertainment system shown in FIG. 12 comprises a video game machine 101 (10, 30, 60) corresponding to that in the foregoing embodiments, a controller 102 (20, 40) corresponding to that in the foregoing embodiments, and a monitor device 100 (television receiver, for example) to which video and audio signals are supplied from the video game machine 101.

The video game machine 101 is provided with memory card slots 114A and 114B allowing a memory card 103 to be inserted therein and ejected therefrom, controller ports 115A and 115B (11, 31, 61) allowing a transceiver 107 (32, 35, 62, 66) such as those described in the foregoing embodiments and a cable plug-in connector (not shown) to be attached thereto or detached therefrom, a disk tray 113, an open/close button 112 for opening or closing the disk tray 113, and an ON/stand-by/reset button 111 for effecting power supply, stand-by and reset; and further comprises, although not shown, an audio/video output terminal (AV multi output terminal), a PC card slot, an optical digital output terminal, an IEEE (Institute of Electrical and Electronics Engineers) 1394 connection terminal, an USB (Universal Serial Bus) connection terminal, a power switch, an AC power input terminal and so forth.

The individual connection terminals including the controller port 115 preferably have asymmetrical openings so as to avoid incorrect insertions.

The video game machine 101 may be such that executing a video game based on an application program thereof stored in a disk-formed medium such as so-called DVD-ROM or CD-ROM, or such that reproducing (decoding) video data or audio data stored for example in a DVD video or CD. For the case the application program thereof contains the foregoing controller connection management program, the video game machine 101 can also send the foregoing controller numbers or so to the controller while being controlled by such program.

Now the application program, video data and audio data are not limited to those stored in a disk medium, but may also be those read out from semiconductor memories or tape media, or those supplied through cable or radio, wide-area or private communication lines.

The appearance of the controller 102 will now be explained referring to FIG. 13.

The controller 102 has a connection port 131 to which a transceiver 135 (42) such as that explained in the foregoing embodiments, and a display portion 130 (21, 41) capable of displaying the controller numbers or character icons. The connection port 131 preferably has an asymmetrical openings so as to avoid incorrect insertions.

The controller 102 has a right grip portion 122 held as being wrapped by the right palm, and a left grip portion 121 held as being wrapped by the left palm.

The controller 102 also has a right operational zone 128 and left operational zone 126 operable by the left and right thumbs while the grip portions 121 and 122 being held in hands; a right analog operation portion 124 and a left analog operation portion 123 again operable by the left and right thumbs in an analog manner; a first right push button 148 and a first left push button 145 operable by left and right first fingers; and a second right push button 147 and a second left push button 146 operable by left and right second fingers.

In the left operational zone 126, an up button 142, a down button 144, a left button 143 and a right button 141 are provided, all of which are used by the player to move, for example, a game character on the display screen. The right operational zone 128 has first to fourth operation buttons 150 to 153 to which functions differ with each other, such as setting of the character functions or execution thereof, are assigned by the game application.

The left and right analog operation portions 123 and 124 have right and left rotary operation elements 125 and 126, respectively, which are fully rotatable around the operation axis and automatically returnable to the neutral position energized by an elastic member when released from the thumb, and individually have a signal generating portion, not shown, capable of generating signals corresponding to the operation of such left and right rotary operation elements 125 and 126.

The left and right analog operation portions 123 and 124 are used for inputting command signals for effecting, typically by rotary operation of such left and right rotary operation elements 125 and 126, analogous motion of the game characters such as moving with rotation, moving with variable velocity and transformation.

The controller 102 is further provided with a mode selection switch 137 for activating or inactivating the functions of the left and right rotary operation elements 125 and 126, a light indicator portion 136 for allowing the player to recognize a selected operation mode typically through illumination of an LED (light emitting diode), a start button 134, selection button 133, and the like.

The mode selection switch 137 is also used for switching the functions of the right operational zone 128 and the left operational zone 126.

The controller 102 also has the display portion 130 explained in the foregoing embodiments at a position well recognizable by the player, typically between the right operational zone 128 and the left operational zone 126, and the connection port 131 to or from which the foregoing transceiver 135 or a cable connector is attached or detached.

Figure 13:
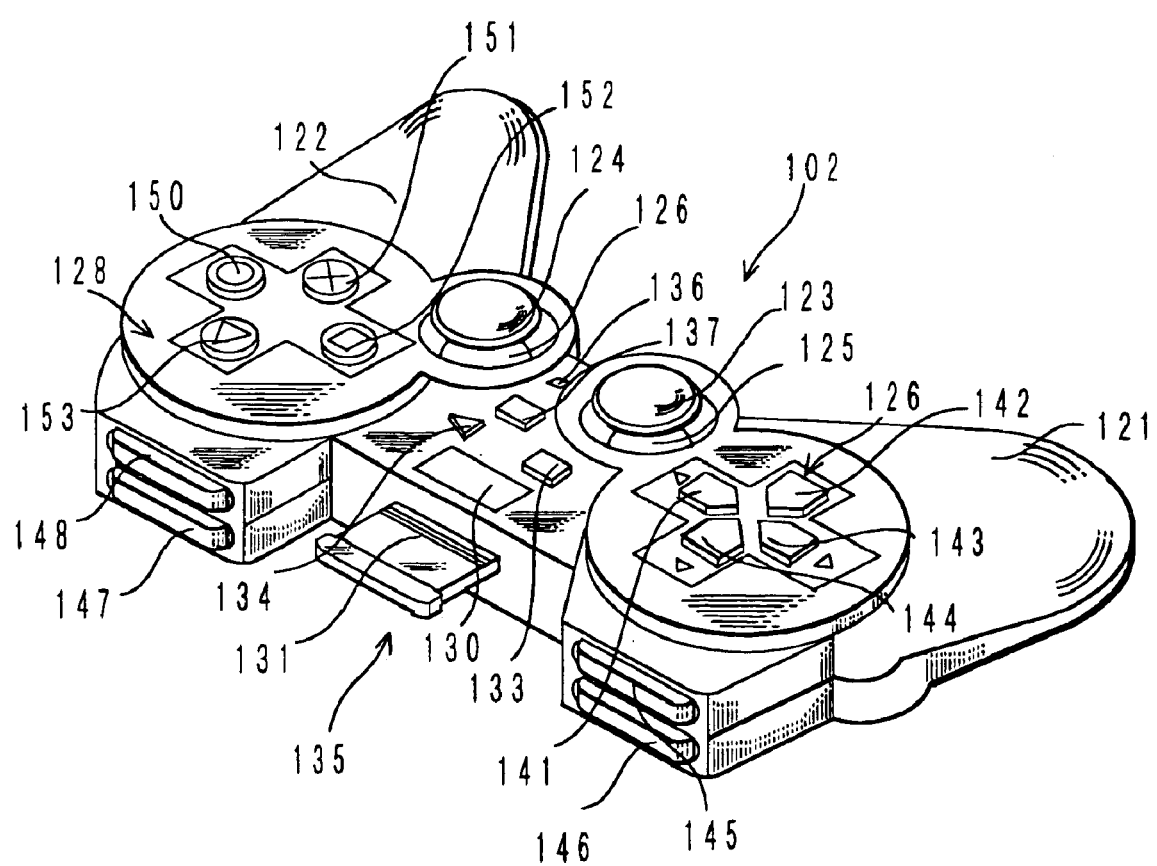
FIG. 13 is a perspective view showing a controller.

The controller 102 further has, in the left and right grip portions 121 and 122, a vibration generating mechanism for generating vibration by, for example, rotating a weight around the axis of rotation of a motor while being kept eccentric therefrom, although not shown in FIG. 13. Activating such vibration generating mechanism in relation to the state of progress of the game will cause vibration felt by the player's hands.

Figure 14:
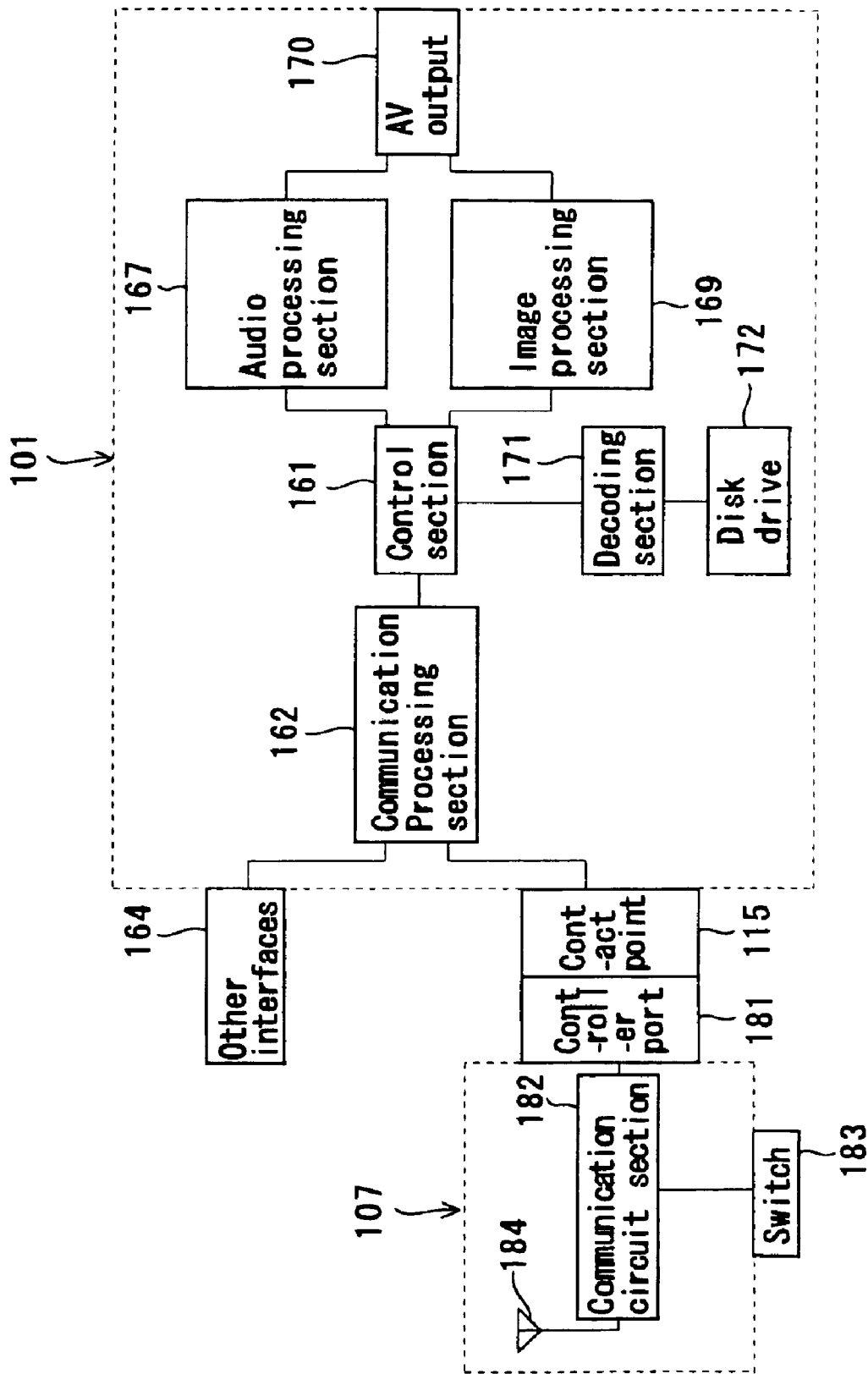
FIG. 14 is a block diagram showing an exemplary internal constitution of a video game machine and a transceiver.

FIG. 14 shows a principal internal constitution of the video game machine 101 and the transceiver 107.

In the case shown in FIG. 14, the video game machine 101 mainly comprises a control section 161 for controlling the individual internal constitutional elements, an image processing section 169 for processing images, an audio processing section 167 for audio processing, a communication processing section 162 responsible for communication, a disk drive 172 for driving a disk medium and a decode processing section 171 for decoding data read out from such disk medium.

The control section 161 typically comprises a CPU (central processing unit) and peripheral devices thereof such as a ROM or RAM, and a transmission control section responsible for interrupt control and direct memory access (DMA) transmission control. The ROM stores an operating system (OS) for managing operations of the image processing section 169 and the audio processing section 167, and other initial set values. The CPU controls the entire operations of the video game machine 101 by executing such operating system stored in the ROM.

The image processing section 169 comprises a graphic processor unit (GPU), a geometry transfer engine (GTE), a frame buffer, an image decoder and so forth. The geometric transfer engine typically executes coordinate transformation including perspective projection transformation, and the graphic processor unit executes drawing based on drawing instruction from the CPU in the control section 161. The frame buffer stores an image drawn by such graphic processor unit, and stores a frame image to be displayed on the television monitor. The image decoder decodes image data decoded as being compressed based on image compression system such that represented by MPEG (Moving Picture Experts Group) standard.

The audio processing section 167 comprises a sound processor unit (SPU), a sound buffer and so forth. The sound processor unit has a function of generating audio data such as music or effective sound and a function of decoding audio data decoded as being compressed based on MPEG Audio or ATRAC (Adaptive TRansform Acoustic Coding; trademark) under the instruction from the CPU in the control section 161. The sound buffer stores waveform data providing a basis on which audio data is generated by the sound processor unit.

The image data generated by the image processing section 169 and the audio data generated by the audio processing section 167 are output from an audio/video output terminal (AV multi output terminal) 170 and then sent to, for example, a television monitor.

When the disk medium storing the foregoing game application program or video/audio data is set and reproduction is instructed by the control section 161, the disk drive 172 reads out data from such disk and then sends them to the decoding section 171.

The decoding section 171 decodes (correcting error of the data coded by error correction coding) the data read out from the disk medium, buffers them and then sends them to the control section 161. Now for the case the data supplied from the decoding section 171 relate to a game application program, the control section 161 allows the image processing section 169 and audio processing section 167 to operate responding to such game application program. For the case the data supplied from the decoding section 171 are video or audio data, the control section 161 sends such data to the corresponding image processing section 169 or audio processing section 167.

The video game machine 101 also has a communication section 162 responsible for communication with the controller 102 through the foregoing controller port 115, or for communication through an interface terminal 164 such as memory card slots 114A, 114B, a PC card slot, an optical digital output terminal, an IEEE 1394 connection terminal and an USB (Universal Serial Bus) connection terminal. The controller port 115 is connected with, for example, the foregoing connection portion 181 (66) of the transceiver 107, and the communication section 162 receives, in a synchronous manner, commands input through the controller 102 by the player.

The transceiver 107 comprises a communication circuit section 182 for effecting bi-directional radio communication, an antenna 184 (34, 64), and, at need, a switch 183 (65) explained in the fifth and sixth embodiments. For the case where the switch 183 is provided as explained in the fifth and sixth embodiments, the communication circuit section 182 also executes controller number generation processing as explained previously referring to FIG. 11.

Figure 15:
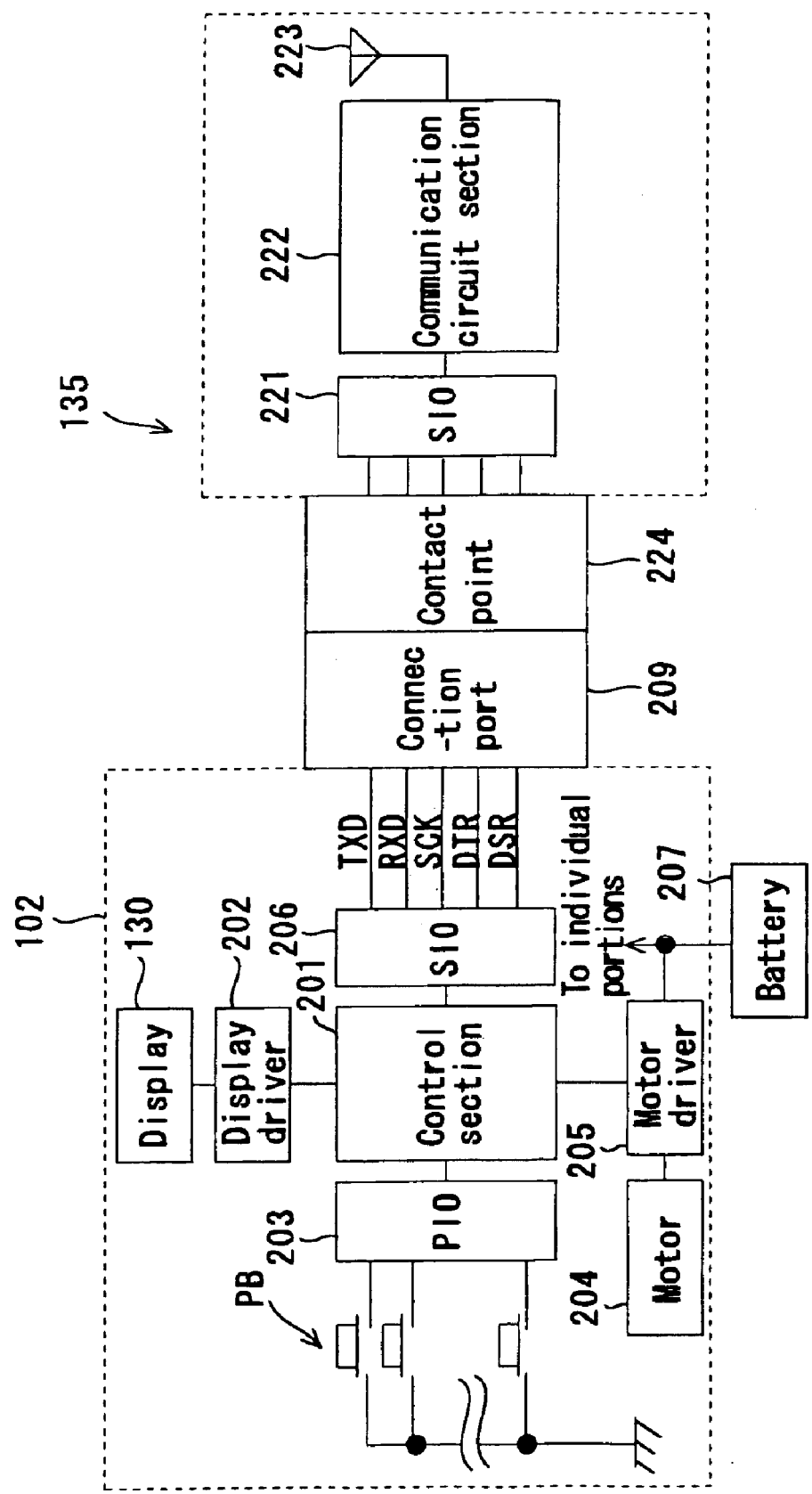
FIG. 15 is a block diagram showing an exemplary internal constitution of a controller and a transceiver.

FIG. 15 shows a principal internal constitution of the controller 102 and the transceiver 135.

In the case shown in FIG. 15, the controller 102 comprises, as major constituents, a control section 201 responsible for a control of operations of the individual sections and communication with the video game machine 101, a parallel interface section 203 responsible for parallel communication between various operational sections or buttons PB and the control section 201, a serial interface section 206 responsible for serial communication with the video game machine 101 through transceiver 135 or a cable, a display driver 202 driving display portion 130, a motor 204 composing the foregoing vibration generating mechanism and a motor driver 205. For the case where the controller 102 and the video game machine 101 are connected by radio communication through the transceiver 135, power is internally supplied from a battery 207. On the other hand, the battery 207 is not always necessary for the case where the video game machine 101 and the controller 102 are connected by a cable and that power is thus supplied from such video game machine 101 through such cable.

The control section 201 typically comprises a CPU and ROM or RAM, where the ROM stores a detection program for detecting input statuses from the various buttons PB, a driver control program for controlling the display driver 202 and the motor driver, a communication program for processing communication with the video game machine 101 and so forth. The internal CPU controls the individual sections based on such programs.

The serial interface section 206 and the connection port 209 are connected by a signal line TXD (Transmit Data) for transmitting data sent from the video game machine 101 to the controller 102, a signal line RXD (Received Data) for transmitting data from the controller 102 to the video game machine 101, a signal line SCK (Serial Clock) for sending serial synchronous clock for extracting data from the signal lines TXD and RXD for the individual data transmission, a control line DTR (Data Terminal Ready) for establishing or interrupting the communication with the controller 102, and a control line DSR (Data Set Ready) for flow control for transmitting a large volume of data.

It is now necessary to provide a power supply line, although not shown, when the controller 102 and the video game machine 101 are connected with a cable and power is supplied from such video game machine 101 through such cable.

The transceiver 135 has a communication circuit section 222 responsible for bi-directional radio communication, an antenna 223 (44) and a serial interface section 221.

While the description for the above embodiment dealt the case that the present invention is applied to the video game machine and the controller thereof, the present invention is also applicable to purposes other than such video game machine and the controller.

The embodiments described in the above are only part of the examples of the present invention. It is therefore to be understood that the present invention may be practiced otherwise than as specifically described herein without departing from the scope and the spirit thereof.

What is claimed is:

1. A method for generating correlation information for indication to a user of an operation terminal, comprising the steps of:
   connecting an information processing device to a plurality of unitary operation terminals each including a transceiver for providing bi-directional communication with the information processing device, each operation terminal being operable by a user to generate input and to transmit the input via the transceiver to the information processing device for controlling specific processing of information performed by the information processing device;
   generating correlation information in the information processing device expressing a correlation between the plurality of operation terminals and the specific information processing controllable by the operation terminals;
   outputting the correlation information from the information processing device to the plurality of operation terminals; and
   receiving the correlation information in the operation terminals and indicating the correlation to the user based on the received correlation information.

2. The method for generating correlation information for indication to a user of an operation terminal according to claim 1, wherein the correlation information includes identification information identifying each of the plurality of operation terminals having the correlation.

3. The method for generating correlation information for indication to a user of an operation terminal according to claim 1, wherein the correlation information includes information for symbolizing the specific information processing controllable by the operation terminals.

4. The method for generating correlation information for indication to a user of an operation terminal according to claim 1, wherein the correlation information includes information which can be displayed on a display unit provided to the operation terminals.

5. The method for generating correlation information for indication to a user of an operation terminal according to claim 1, further comprising the steps of:
    initializing a table in which at least a subset of the plurality of operation terminals are listed;
    detecting an operation terminal not listed in the table; and
    entering the detected operation terminal into the table,
    wherein the generating step further includes generating correlation information for the operation terminals listed in the table and the outputting step further includes outputting the correlation information to the operation terminals listed in the table.

6. The method for generating correlation information for indication to a user of an operation terminal according to claim 5, wherein the detecting step includes attempting to establish communication with the plurality of operation terminals listed in the table, the method further comprising selectively deleting from the table any operation terminal with which communication is not established.

7. A unitary operation terminal, comprising:
    means for generating input as controlled by an operator;
    means for displaying visually recognizable information to the operator;
    a transceiver for providing bi-directional communication with an information processing device to which the operation terminal is connectable, the transceiver being operable to transmit the generated input to the information processing device and to receive at least correlation information expressing a correlation between the operation terminal and information for controlling specific processing of information performed by the information processing device,
    wherein the displaying means is operable to display the correlation based on the received correlation information.

8. The operation terminal according to claim 7, wherein the correlation information includes identification information identifying each of a plurality of operation terminals having the correlation.

9. The operation terminal according to claim 7, wherein the correlation information includes information for symbolizing the specific information processing that is controllable by the operation terminal.

10. An operation terminal operable by an operator and connectable to an information processing device and capable of receiving information from the information processing device, comprising:
    a display; and
    a receiver operable to receive at least correlation information expressing a correlation between the operator and information operable by the operator among all information handled by the information processing device,
    wherein the display is operable to display the received correlation information.

11. An information communication system, comprising an information processing device; and
    a plurality of operation terminals connected to the information processing device, each operating terminal including a transceiver for effecting bi-directional information communication with the information processing device, and display means, the information processing device including:
    means f or generating correlation information expressing a correlation between each of the plurality of operation terminals arid specific information processing which is controllable by the operation terminals; and
    means for outputting the correlation information to the operation terminals such that the operation terminals receive and display the correlation to an operator based on the received correlation information.

12. The information communication system according to claim 11, wherein the means for generating the correlation information includes means for generating identification information identifying the correlation of the plurality of the operation terminals.

13. The information communication system according to claim 11, wherein the means for generating the correlation information includes means for generating information for symbolizing the specific information processing controllable by the operation terminals.

14. An information communication system, comprising:
    an information processing device;
    a plurality of unitary operation terminals each including a transceiver and a display, each operation terminal being connected to the information processing device for effecting bi-directional communication with the information processing device and being operable by a user to generate input and transmit the input via the transceiver to the information processing device for controlling specific processing of information performed by the information processing device, and to receive correlation information from the information processing device,
    the information processing device being operable to generate the correlation information expressing a correlation between each of the plurality of operation terminals and the specific information processing controllable by the operation terminals to output the correlation information to the operation terminals, and the display being operable to visually indicate the correlation to a user based on the received correlation information.

15. A recording medium storing a processing program for performing a method, the method comprising the steps of:
    connecting an information processing device to a plurality of unitary operation terminals each including a transceiver for providing bi-directional communication with the information processing device, each operation terminal being operable by a user to generate input and to transmit the input via the transceiver to the information processing device for controlling specific processing of information performed by the information processing device;
    generating correlation information in the information processing device expressing a correlation between the plurality of operation terminals and the specific information processing controllable by the operation terminals;
    outputting the correlation information from the information processing device to the plurality of operation terminals; and
    receiving the correlation information in the operation terminals and indicating the correlation to the user based on the received correlation information.

16. The recording medium storing a processing program according to claim 15, wherein the generating step includes generating identification information identifying each of the plurality of operation terminals having the correlation.

17. The recording medium storing a processing program according to claim 15, wherein the generating step includes generating information for symbolizing the specific information processing controllable by the operation terminals.

18. The recording medium storing a processing program according to claim 15, wherein the generating step includes generating information which can be displayed on a display unit provided to the operation terminal.

19. The recording medium storing a processing program according to claim 15, the method further comprising the steps of:
  initializing a table in which at least a subset of the plurality of the operation terminals are listed;
  detecting an operation terminal not listed in the table; and
  entering the detected operation terminal into the table;
  wherein the generating step further includes generating correlation information for the operation terminals listed in the table and the outputting step further includes outputting the correlation information to the operation terminals listed in the table.

20. The recording medium storing a processing program according to claim 19, the program further comprising selectively deleting from the table any operation terminal with which the communication is not established.

21. An information processing device having a bi-directional connection terminal and being operable to communicate bi-directionally with an operation terminal through the connection terminal, the operation terminal having a display and being operable by a user to generate and transmit input to the information processing device for controlling specific processing of information performed by the information processing device, comprising:
  establishment determining means for determining if communication is established with the operation terminal through the connection terminal;
  display information generating means operable to assign information identifying the operation terminal and to generate display information to be displayed on the display of the operation terminal based on the assigned information when the establishment determining means determines that communication is established with the operation terminal; and
  transmitting means operable to transmit the display information generated by the display information generating means to the operation terminal through the connection terminal.

22. The information processing device according to claim 21, wherein the display information is an icon.

23. The information processing device according to claim 21, wherein the display information is a number.

24. The information processing device according to claim 21, wherein the information processing device is a video game entertainment device and the operation terminal is a game controller.

25. The information processing device according to claim 21, the information processing device having a plurality of the connection terminals and being operable to communicate with a plurality of the operation terminals through the plurality of connection terminals, each of the plurality of operation terminals having a display and being operable by a user to generate input and to transmit the input via one of the plurality of connection terminals to the information processing device for controlling specific processing of information performed by the information processing device, wherein the establishment determining means determines a connection relationship between each of the plurality of operation terminals and each of the plurality of connection terminals, and
  the display information generating means is operable to assign information identifying each of the plurality of operation terminals based on the connection relationship between the operation terminals and the connection terminals, and in accordance with an information assignment order predetermined for each of the connection terminals.

26. The information processing device according to claim 21, further comprising:
  a table; and
  table entering means for entering into the table information listing the operation terminal for which the establishment determining means determines that the communication is established,
  wherein the display information generating means is operable to assign the information identifying the operation terminal to the operation terminal listed in the table.

27. A method for assigning identification information to an operation terminal comprising the steps of:
  connecting an information processing device to an operation terminal through a bi-directional connection terminal, the operation terminal having a display and being operable by a user to generate input and transmit the input via the connection terminal to the information processing device for controlling specific processing of information performed by the information processing device;
  determining if bi-directional communication is established between the information processing device and the operation terminal through the connection terminal;
  assigning information identifying the operation terminal and generating display information to be displayed on the display of the operation terminal based on the assigned information when communication is established with the operation terminal; and
  transmitting the, display information to the operation terminal through the connection terminal.

28. The method for assigning identification information to an operation terminal according to claim 27, wherein the display information is an icon.

29. The method for assigning identification information to an operation terminal according to claim 27, wherein the display information is a number.

30. The method for assigning identification information to an operation terminal according to claim 27, further comprising the steps of:
  determining a connection relationship between each of a plurality of the operation terminals and each of a plurality of the connection terminals; and
  assigning the information identifying the operation terminal to each of the operation terminals based on the connection relationship between the operation terminals and the connection terminals, and based on an information assignment order predetermined for each of the connection terminals.

31. The method for assigning identification information to an operation terminal according to claim 27, further comprising the step of entering into a table information listing the operation terminal for which the establishment determining means determines that the communication is established, and the assigning step includes assigning the information identifying the operation terminal to the operation terminal listed in the table.

* * * * *

UNITED STATES PATENT AND TRADEMARK OFFICE
CERTIFICATE OF CORRECTION

| | |
|---|---|
| PATENT NO. | : 6,939,232 B2 |
| APPLICATION NO. | : 09/938446 |
| DATED | : September 6, 2005 |
| INVENTOR(S) | : Makoto Tanaka, Toru Akazawa and Rajesh Kumar Dixit |

It is certified that error appears in the above-identified patent and that said Letters Patent is hereby corrected as shown below:

On the face of the patent:

(57)  ABSTRACT, line 9, after "handled on" delete --an--.

In the Specification:

Column 1, line 36 "appear" should read --appearing--.
Column 5, line 61 after "number "1"" insert --,--.
Column 5, line 61 after "example" insert --,--.
Column 5, line 62 after "number "2"" insert --,--.
Column 5, line 62 after "example" insert --,--.
Column 6, line 26 "have" should read --has--.
Column 6, line 43 "an" should read --a--.
Column 7, line 64 after "described" delete --in--.
Column 8, line 7 "that" should read --where--.
Column 10, line 48 after "in" insert --,--.
Column 10, line 48 after "example" insert --,--.
Column 10, line 49 after "sends" insert --,--.
Column 10, line 49 after "example" insert --,--.
Column 10, line 52 after "sends" insert --,--.
Column 10, line 52 after "example" insert --,--.
Column 11, line 51 after "case" insert --where--.
Column 12, line 32 after "case" insert --where--.
Column 12, line 63 before "which" delete --that--.
Column 13, line 38 after "32B" insert --,--.
Column 13, line 38 after "example" insert --,--.
Column 13, line 58 after "portions" insert --the--.
Column 14, line 10 after "case" insert --where--.
Column 14, line 11 after "two" insert --,--.
Column 14, line 11 after "example" insert --,--.
Column 14, line 18 after "case" insert --where--.
Column 14, line 20 after "case" insert --where--.
Column 14, line 34 "as" should read --is--.
Column 14, line 35 "as" should read --is--.
Column 14, line 61 "are" should read --is--.
Column 15, line 20 "controller" should read --controllers--.
Column 16, line 30 "is" should read --if--.
Column 17, line 21 after "stored" insert --,--.
Column 17, line 21 after "example" insert --,-- .

UNITED STATES PATENT AND TRADEMARK OFFICE
CERTIFICATE OF CORRECTION

PATENT NO. : 6,939,232 B2
APPLICATION NO. : 09/938446
DATED : September 6, 2005
INVENTOR(S) : Makoto Tanaka, Toru Akazawa and Rajesh Kumar Dixit It is certified that error appears in the above-identified patent and that said Letters Patent is hereby corrected as shown below:

In the Specification (cont'd):

Column 19, line 21 after "case" insert --where--.
Column 19, line 25 after "case" insert --where--.
Column 22, line 8 "f or" should read --for--.
Column 22, line 10 "arid" should read --and--.
Column 24, line 39 after "transmitting the" delete --,--.

Signed and Sealed this

Fifth Day of June, 2007

JON W. DUDAS
*Director of the United States Patent and Trademark Office*